US010537798B2

(12) United States Patent
Takahashi et al.

(10) Patent No.: US 10,537,798 B2
(45) Date of Patent: Jan. 21, 2020

(54) SERVER APPARATUS, DYNAMIC-IMAGE DELIVERY SYSTEM, AND CONTROL METHOD AND COMPUTER READABLE STORAGE MEDIUM USED THEREIN

(71) Applicant: Konami Digital Entertainment Co., Ltd., Minato-ku, Tokyo (JP)

(72) Inventors: Kazuya Takahashi, Minato-ku (JP); Takashi Taniguchi, Minato-ku (JP); Hiroshi Yokota, Minato-ku (JP); Hiroyuki Hosoyama, Minato-ku (JP); Takayuki Akita, Minato-ku (JP); Yuichi Tomoyose, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 286 days.

(21) Appl. No.: 15/443,713

(22) Filed: Feb. 27, 2017

(65) Prior Publication Data

US 2017/0165571 A1    Jun. 15, 2017

Related U.S. Application Data

(63) Continuation of application No. PCT/JP2015/074678, filed on Aug. 31, 2015.

(30) Foreign Application Priority Data

Sep. 2, 2014   (JP) .................. 2014-178602

(51) Int. Cl.
*A63F 13/35*   (2014.01)
*A63F 13/49*   (2014.01)
(Continued)

(52) U.S. Cl.
CPC ............ *A63F 13/35* (2014.09); *A63F 13/355* (2014.09); *A63F 13/49* (2014.09); *A63F 13/52* (2014.09);
(Continued)

(58) Field of Classification Search
CPC ........ A63F 13/35; A63F 13/65; A63F 13/355; A63F 13/95; A63F 13/79; A63F 13/49;
(Continued)

(56) References Cited

U.S. PATENT DOCUMENTS

| 2008/0292151 A1* | 11/2008 | Kurtz | ....................... A61B 3/10 |
| | | | 382/128 |
| 2012/0116559 A1* | 5/2012 | Davis | ...................... G06F 3/002 |
| | | | 700/94 |

(Continued)

FOREIGN PATENT DOCUMENTS

| CN | 103024447 A | 4/2013 |
| JP | 2011-077731 A | 4/2011 |

(Continued)

OTHER PUBLICATIONS

The First Office Action (CN Patent Application No. 2015800415430); dated Dec. 5, 2018; 13 pages.

(Continued)

*Primary Examiner* — Kevin Y Kim
(74) *Attorney, Agent, or Firm* — Howard & Howard Attorneys PLLC

(57) ABSTRACT

The server apparatus is applied to a game system which has a storage unit storing gaming dynamic images different from each other in association with a stream ID for identifying each gaming dynamic image. The game system acquires a playing dynamic image photographed by a portable phone and a stream ID of the playing dynamic image via a network. Base on the acquisition result, the game system determines the gaming dynamic image whose stream ID corresponds to the stream ID of the playing dynamic image acquired as a target gaming dynamic image, and provides a dynamic-image delivery service so that a delivery screen is displayed at each personal computer, the delivery screen including a (Continued)

composite dynamic image where the playing dynamic image and the target gaming dynamic image are synthesized.

19 Claims, 16 Drawing Sheets

(51) Int. Cl.
    *A63F 13/79*     (2014.01)
    *A63F 13/95*     (2014.01)
    *A63F 13/355*    (2014.01)
    *A63F 13/52*     (2014.01)
    *A63F 13/65*     (2014.01)
    *A63F 13/53*     (2014.01)

(52) U.S. Cl.
    CPC .............. *A63F 13/65* (2014.09); *A63F 13/79* (2014.09); *A63F 13/95* (2014.09); *A63F 13/53* (2014.09); *A63F 2300/8094* (2013.01)

(58) Field of Classification Search
    CPC ... A63F 13/52; A63F 13/53; A63F 2300/8094
    See application file for complete search history.

(56) References Cited

U.S. PATENT DOCUMENTS

2012/0121128 A1* 5/2012 Lawrence ............... A63F 13/06
    382/103

2013/0095855 A1* 4/2013 Bort ........................ G06T 17/05
    455/456.2
2013/0172070 A1* 7/2013 Kim ....................... A63F 13/493
    463/24

FOREIGN PATENT DOCUMENTS

JP     2012-090120 A     5/2012
JP     2013-210828 A    10/2013

OTHER PUBLICATIONS

Decision to Grant a Patent (JP Patent Application No. 2014-178602); Date of Drafting: Feb. 28, 2019; Includes English Translation; 6 pages.
Notification of Reasons for Refusal (JP Patent Application No. 2014-178602); Date of Drafting: Jul. 26, 2018.
International Search Report (English Translation and Japanese Document), International Application No. PCT/JP2015/074678, dated Nov. 24, 2015.
Written Opinion (English Translation and Japanese Document), International Application No. PCT/JP2015/074678, dated Nov. 24, 2015.
The Second Office Action (CN Application or Publication No. 201580041543.0); dated Jun. 12, 2019; 32 pages; Includes English Translation.
Notification to Grant Patent Right for Invention (CN 201580041543.0): dated Sep. 24, 2019; Includes English Translation; 3 pages.

* cited by examiner

SERVER APPARATUS, DYNAMIC-IMAGE DELIVERY SYSTEM, AND CONTROL METHOD AND COMPUTER READABLE STORAGE MEDIUM USED THEREIN

CROSS-REFERENCE TO RELATED APPLICATION

This application is a continuation of PCT Application No. PCT/JP2015/074678, filed Aug. 13, 2015, which claims priority to Japanese Patent Application No. 2014-178602, filed Sep. 2, 2014, the disclosures of which are hereby incorporated by reference in their entirety.

FIELD OF INVENTION

The present invention relates to a server apparatus connected, via a network, to a display-use terminal which is used to display a predetermined screen and a photography-use terminal which is used to photograph terminal dynamic image.

BACKGROUND ART

There is known to be a server apparatus connected, via a network, to a display-use terminal where a predetermined screen is displayed. For example, there is known to be an image processing system including a cloud service connected to clients, each of the clients displaying a game screen including a plurality of game-play dynamic images showing states of games which a plurality of users are playing respectively (for example patent literature #1).

CITATION LIST

Patent Literature

PTL #1: JP2012-90120 A.

SUMMARY OF INVENTION

Technical Problem

In the image processing system disclosed by the patent literature #1, the game screen functions as the predetermined screen, the client functions as the display-use terminal, and the cloud service functions as the server apparatus. At each client, a game screen where the plurality of game-play dynamic images are synthesized is displayed. However, the plurality of game-play dynamic images are just the same kind dynamic-images as each other. That is, in the image processing system in the patent literature #1, though players different from each other are playing the games, showed are only the dynamic images of the same game provided by the same kind of clients. The patent literature #1 does not mention a possibility that different kinds of dynamic image are provided from some devices other than the clients. As a result, in the image processing system in the patent literature #1, the kind of dynamic image to be displayed, which is a target to be synthesized, on the game screen is restricted.

In consideration of the above, the present invention aims to provide a server apparatus and the like which allows a display-use terminal to display different kinds of dynamic image on a predetermined screen.

Solution to Problem

A first server apparatus as one aspect of the present invention is a server apparatus which is connected with, via a network, at least one display-use terminal each being programmed to display a predetermined screen and at least one photography-use terminal each being programmed to photograph a terminal dynamic image, the server apparatus comprising: a dynamic image storage device which stores a plurality of dynamic images different from each other in association with dynamic image identification information for identifying each of the plurality of the dynamic images; and a computer; the computer being programmed to function as: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; and a dynamic image providing device which is configured to provide the terminal dynamic image and the target dynamic image to the display-use terminal, based on a determination result of the dynamic image determining device.

A control method as a further aspect of the present invention is a control method for making a computer of a server apparatus, the server apparatus being connected with, via a network, at least one display-use terminal each being programmed to display a predetermined screen and at least one photography-use terminal each being programmed to photograph a terminal dynamic image, and comprising a dynamic image storage device which stores a plurality of dynamic images different from each other in association with dynamic image identification information for identifying each of the plurality of the dynamic images, the method for making the computer execute the following steps: a dynamic image acquiring step of acquiring from the photography-use terminal, the terminal dynamic image, and specific information for specifying the dynamic image identification information which is associated with the terminal dynamic image; a dynamic image determining step of determining a dynamic image corresponding to the dynamic image identification information specified by the specific information, as a target dynamic image within the plurality of dynamic images, based on an acquisition result of the dynamic image acquiring step; and a dynamic image providing step of providing the terminal dynamic image and the target dynamic image to the display-use terminal, based on a determination result of the dynamic image determining step A non-transitory computer readable storage medium as a further aspect of the present invention is a non-transitory computer readable storage medium storing a computer program for a server apparatus, the server apparatus being connected with, via a network, at least one display-use terminal each being programmed to display a predetermined screen and at least one photography-use terminal each being programmed to photograph a terminal dynamic image, and comprising a computer, and a dynamic image storage device which stores a plurality of dynamic images different from each other in association with dynamic image identification information for identifying each of the plurality of the dynamic images, the computer program making the computer execute: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; a dynamic image providing device which is configured to provide the terminal dynamic image and the target dynamic image to the display-use terminal, based on a generation result of the composite dynamic image generating device.

A first dynamic-image delivery system as a further aspect of the present invention is a dynamic-image delivery system including at least one display-use terminal each being programmed to display a predetermined screen, at least one photography-use terminal each being programmed to photograph a terminal dynamic image, and a server apparatus, wherein the at least one display-use terminal and the at least one photography-use terminal, and the server apparatus are connected with each other via a network, the dynamic-image delivery system comprising: a dynamic image storage device which stores a plurality of dynamic images different from each other in association with dynamic image identification information for identifying each of the plurality of the dynamic images; a dynamic image acquiring device programmed to acquire from the photography-use terminal, the terminal dynamic image, and specific information for specifying the dynamic image identification information which is associated with the terminal dynamic image; a dynamic image determining device programmed to determine a dynamic image corresponding to the dynamic image identification information specified by the specific information, as a target dynamic image within the plurality of dynamic images, based on an acquisition result of the dynamic image acquiring device; and a dynamic image providing device programmed to provide the terminal dynamic image and the target dynamic image to the display-use terminal, based on a determination result of the dynamic image determining device.

A second dynamic-image delivery system as a further aspect of the present invention is a dynamic-image delivery system in which at least one display-use terminal each being programmed to display a predetermined screen, at least one photography-use terminal each being programmed to photograph a terminal dynamic image, and a server apparatus are connected with each other via a network, the dynamic-image delivery system comprising: a dynamic image storage device which stores a plurality of dynamic images different from each other in association with dynamic image identification information for identifying each of the plurality of the dynamic images; a dynamic image acquiring device programmed to acquire from the photography-use terminal, the terminal dynamic image, and specific information for specifying the dynamic image identification information which is associated with the terminal dynamic image; a dynamic image determining device programmed to determine a dynamic image corresponding to the dynamic image identification information specified by the specific information, as a target dynamic image within the plurality of dynamic images, based on an acquisition result of the dynamic image acquiring device; a composite dynamic image generating device programmed to generate a composite dynamic image where the terminal dynamic image and the target dynamic image are synthesized, based on a determination result of the dynamic image determining device; and a dynamic image providing device programmed to provide the composite dynamic image so that the composite dynamic image is displayed in the predetermined screen, based on a generation result of the composite dynamic image generating device.

A second server apparatus as a further aspect of the present invention is a server apparatus which is connected with, via a network, at least one display-use terminal each being programmed to display a predetermined screen and at least one photography-use terminal each being programmed to photograph a terminal dynamic image, the server apparatus comprising: a dynamic image storage device which stores a plurality of dynamic images different from each other in association with dynamic image identification information for identifying each of the plurality of the dynamic images; and a computer; the computer being programmed to function as: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; a composite dynamic image generating device which is configured to generate a composite dynamic image where the terminal dynamic image and the target dynamic image are synthesized, based on a determination result of the dynamic image determining device; and a dynamic image providing device which is configured to provide the composite dynamic image so that the composite dynamic image is displayed in the predetermined screen, based on a generation result of the composite dynamic image generating device.

DETAILED DESCRIPTION OF THE INVENTION

Figure 1:
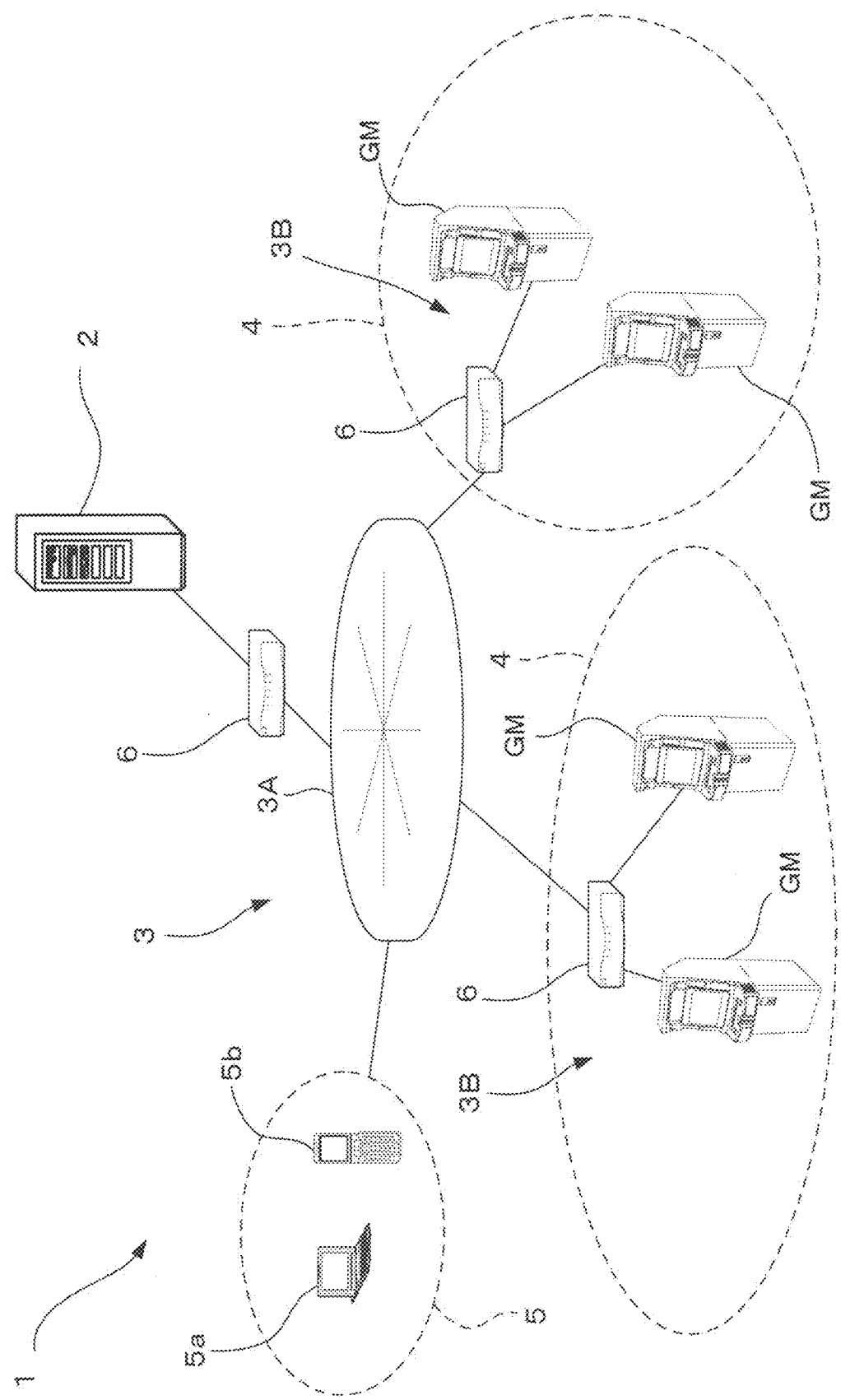
FIG. 1 is a diagram showing an overview of a whole configuration of a game system to which a dynamic-image delivery system as one aspect of the present invention is applied.

Hereinafter, a game system to which a dynamic-image delivery system is applied as one aspect of the present invention will be explained. FIG. 1 is a diagram showing an overview of a whole configuration of the game system to which the dynamic-image delivery system as one aspect of the present invention is applied. As shown in FIG. 1, the game system 1 includes a center server 2 as a server apparatus and a plurality of game machines GM. It is not necessary to configure the center server 2 as one physical apparatus. For example, one logical server configured by a plurality of physical servers may be employed as the center server 2. Further, the center server 2 may be configured logically by using a cloud computing technology. Further, the game machine GM may function as the center server 2.

Each of the game machines GM is connected with the center server 2 via a network 3. Each game machine GM is a game machine for business use (commercial use) which allows a user to play a game in a range corresponding to a counter value consumed by the user. As one example, each game machine GM provides a music game in exchange of a consumption of a predetermined counter value. Appropriate pieces of the game machines GM have been installed for each commercial facility such as a store 4 as a facility.

Further, with the center server 2, a user terminal 5 is connected via the network 3. The user terminal 5 is one kind of a network terminal apparatus which performs various kinds of functions by executing software. As the user terminal 5, for example, used are a personal computer 5a as a display-use terminal and a portable phone 5b (including a smart phone) as a photography-use terminal. Besides that, as the user terminal 5, various network terminal apparatuses available for network connection may be applied.

The network 3 includes a WAN (wide area network) 3A and LANs (local area networks) 3B. Applied as the WAN 3A is, for example, the internet using the TCP/IP protocol to realize a network communication. Each of the LANs 3B is configured for each store 4 so that the game machines GM within the store 4 are connected with each other. The LAN 3B is configured as, for example, the intranet using the TCP/IP. Each LAN 3B and the center server 2 are connected with the WAN 3A via a router 6.

The network 3 is limited to an embodiment which uses the TCP/IP protocol. Various kinds of embodiments each using a wired line for communication, a wireless line for communication (including an infrared communication, a near filed communication and the like), or the like may be applied to the network 3. Or, the communication between the user terminal 5 and the game machine GM and the like may be realized by, not using the line for communication (including a wired one and a wireless one), using codes (for example, two-dimension codes), the codes being generated in conformity with the a predetermined standard so as to include various kinds of information. Accordingly, the term "network" (or "communication line") includes an embodiment where information can be sent and received without using the lines, such as a communication method using the mentioned codes.

The center server 2 provides various kinds of game machine service to each game machine GM or the user thereof. As the game machine service, may be provided, a service that receives identification information of a user from each game machine GM and verifies the user. Further, may be also provided, a service that receives from the game machine game-play data of the user verified and stores the game-play data, or a service that serves to each game machine GM the game-play data stored. In addition, the game machine service may include a service that delivers and updates a computer program or data of each game machine GM via the network 3, a matching service that matches users when the users are going to play a common game via the network 3, and the like.

Further, the center server 2 provides various kinds of Web service to a user of each user terminal 5 via the network 3. The Web service includes a game information service that provides various kinds of information relating to games provided by each game machine GM. Besides that, the Web service includes a delivery service that delivers various kinds of data or software (including updates data or the like) to each user terminal 5. Similarly, the Web service also includes services such as a community service that provides a communication site where users can transmit, exchange, and share information, and a service that issues a user ID for identifying each user. Further, the community service includes a dynamic-image delivery service. The game system 1, by providing the dynamic-image delivery service, functions as a dynamic-image delivery system as one aspect of the present invention. The details of the dynamic-image delivery service will be described later.

Figure 2:
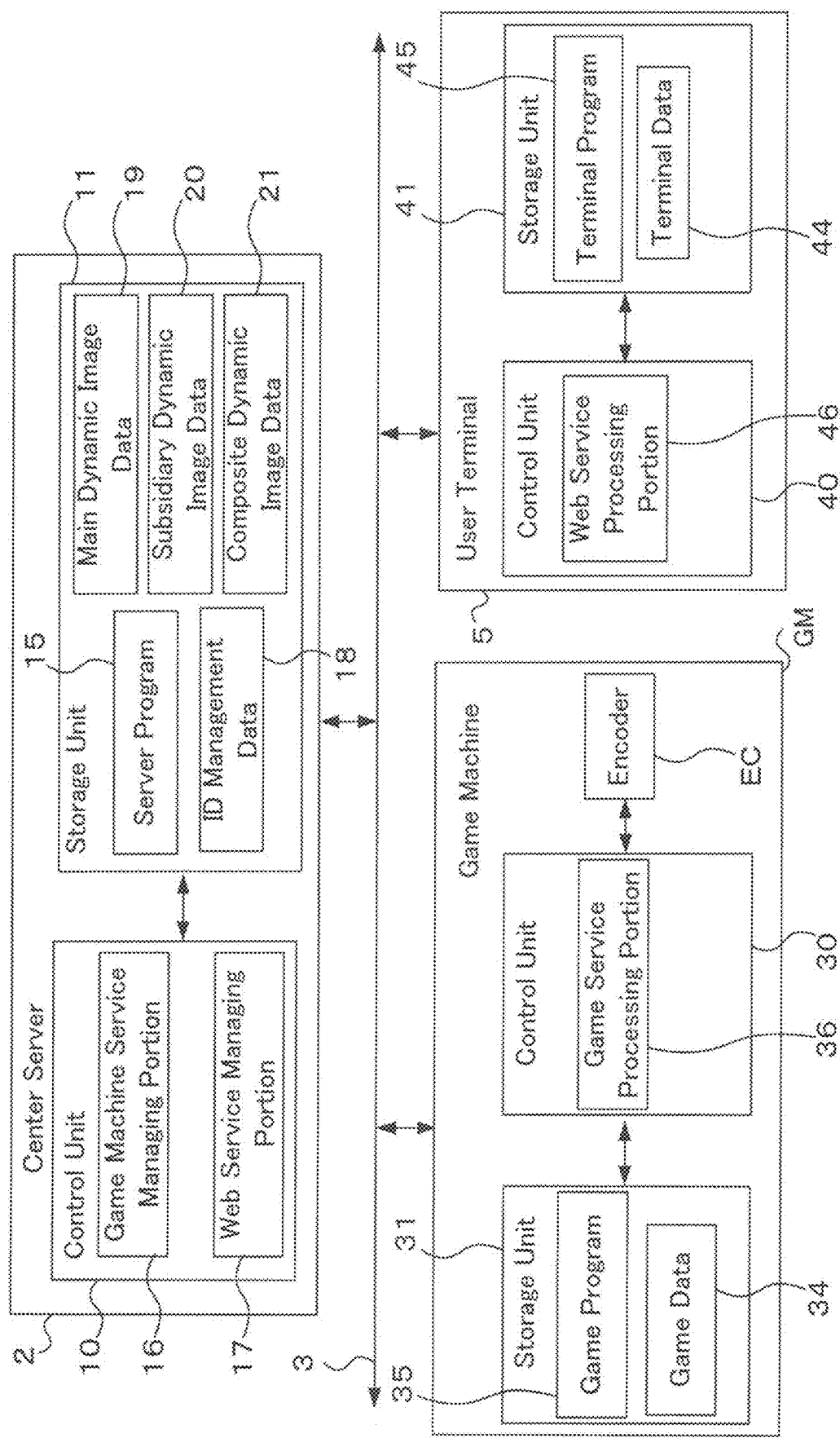
FIG. 2 is a diagram showing configuration of main portions of a control system of the game system.

Next, main portions of a control system of the game system 1 for providing the dynamic-image delivery service will be described. FIG. 2 is a diagram showing a configuration of the main portions of the control system of the game system 1. As shown in FIG. 2, the center server 2 comprises a control unit 10 and a storage unit 11. The control unit 10 is configured as a computer unit which is a combination of a micro processer and various kinds of peripheral devices necessary for operations of the micro processer, such as internal memory devices (as one example, a ROM and a RAM). Although the control unit 10 is also connected with input devices such as a keyboard, output devices such as a monitor, and the like, they are not shown in the drawings.

The storage unit 11 is connected with the control unit 10. The storage unit 11 is configured by a mass-storage medium, such as a magnetic tape, so as to retain memory without power supply. In the storage unit 11, a server program 15 is stored. The server program 15 is a computer program necessary for the center server 2 to provide various kinds of services to the game machines GM and the user terminals 5. By reading and executing the server program 15, the control unit 10 provides a game machine service managing portion 16 and a Web service managing portion 17 therein.

The game machine service managing portion 16 is configured to execute processing necessary for providing the mentioned game machine service. The Web service managing portion 17 is configured to execute processing necessary for providing the mentioned Web service. Each of the game machine service managing portion 16 and the Web service managing portion 17 is a logical device realized by a combination of computer hardware and the computer program. Although further various logical devices can be provided in the control unit 10, they are not shown in the drawings.

The storage unit 11 has various kinds of data which can be referenced while the server program 15 is being executed. In such various kinds of data, ID management data 18, main dynamic-image data 19, subsidiary dynamic-image data 20, and composite dynamic image data 21 are included. The details there of will be described later.

Further, as the various kinds of data, the mentioned game-play data may be stored, in addition to the mentioned ID management data 18 and the like. In the game-play data, written is information relating to past game-play results of each user. The game-play data may be used, for example, for turning over previous results of game-play (past results) to the next time and later, or for turning over setting contents unique for each user. Although further various kinds of data can be stored in the storage unit 11, the explanations and illustrations are omitted.

Each game machine GM is provided with a computer unit 30 as a computer, a storage unit 31, and an encoder EC. The control unit 30 is configured as a computer unit which is a combination of a micro processer and various kinds of peripheral devices necessary for operations of the micro processer, such as internal memory devices (as one example, a ROM and a RAM). Besides that, the control unit 30 is possible to be connected, similarly to a publicly known game machine, with various kinds of output devices and input devices, such as a monitor, a speaker, a control panel, a coin verifier, and a card reader. In such input devices, for example, a state detector is included. The state detector is a well-known device for detecting a state of a person being monitored (including the following information: an entire posture; a position of each part; a skeleton; and the like) and change of the state. The state detector includes, for example, an optical sensor (a well-known sensor for detecting states and motions of each part of a person being monitored) and a depth sensor (a well-known sensor for detecting a distance between the state detector and the person being monitored). However, these kinds of output devices and input devices are not shown in the drawings.

The storage unit 31 is connected with the control unit 30. The storage unit 31 is configured by, for example, a magnetic storage medium, an optical storage medium, and a flash SSD (Solid State Drive), and the like, so as to retain memory without power supply. The storage unit 31 has a game data 34 and a game program 35 therein. The game program 35 is a computer program necessary for the game machine GM to provide a music game. When executing the game program 35, the control unit 30 provides a game service processing portion 36 therein. The game service processing portion 36 is configured to execute various kinds of processing necessary for providing the music game. The game service processing portion 36 is a logical device which is realized by a combination of computer hardware and the computer program. Although further various logical devices can be provided in the control unit 30, they are not shown in the drawings.

The game data 34 can be referenced while the game program 35 is being executed. The game data 34 includes, for example, image data and effect sound data. The image data is data necessary for displaying on the monitor various kinds of images, such as various kinds of game screens for the music game. The effect sound data is data necessary for reproducing various kinds of sounds, such as effect sounds, for the music game through the speaker. Further, the game data 34 may further include, for example, the mentioned game-play data and the mentioned ID management data 18. As one example, at least one part of each of the game-play data and the ID management data 18 is provided from the center server 2 so that a necessary portion is included. Although the game data 34 can further include various kinds of data necessary for providing the music game, the explanation and illustration thereof are omitted.

Figure 16:
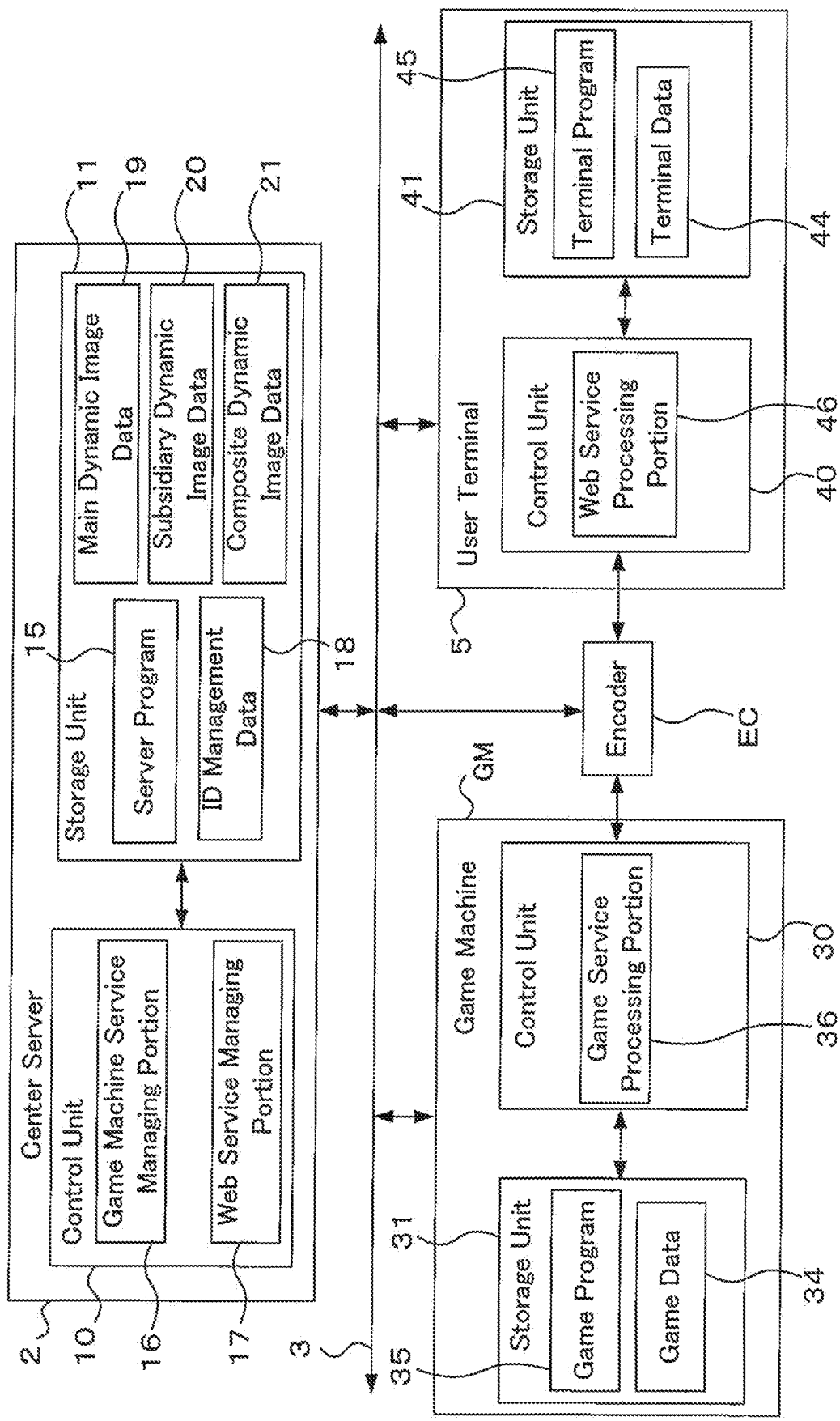
FIG. 16 is a diagram showing a configuration of main portions of a control system of a game system according to the variation.

The encoder EC is a device for providing the dynamic-image delivery service. For example, via the encoder EC, a game screen of the music game provided by each game machine GM is also provided to the center server 2. The encoder EC is controlled by the control unit 30. However, the encoder EC may be omitted. In this case, the control unit 30 may function similarly to the encoder. Alternatively, the encoder EC may be provided as a construction other than each game machine GM. For example, each game machine GM and each user terminal 5 may be connected with each other via the encoder EC. In this case, each user terminal 5 may be configured to function as a control terminal which controls a part of functions of each game machine GM via the encoder EC. More specifically, the control unit 30 of each game machine GM and a control unit 40 of each user terminal 5 may be connected with each other via the encoder EC (see FIG. 16). Then, functions (for example, the mentioned function for providing the game screen as appropriate to the center server 2) for executing various kinds of setting (for example, an instruction of start of the dynamic-image delivery service) necessary for providing the dynamic-image delivery service and the like, may be controlled by the control unit 40 as the part of functions. That is, the encoder EC may function as a device which makes each user terminal 5 function as a part of the game machine GM, the user terminal 5 being additionally connected with the encoder EC at an appropriate time. And, a function as a device for providing the dynamic-image delivery service may be added to each game machine GM via the encoder 5 by the user terminal 5. That is, in this case, the function for realizing the dynamic-image delivery service is not necessary to be provided to each game machine GM in advance.

The user terminal 5 is provided with the control unit 40 and a storage unit 41. The control unit 40 is configured as a computer unit which is a combination of a micro processer and various kinds of peripheral devices necessary for operations of the micro processer, such as internal memory devices (as one example, a ROM and a RAM). The control unit 40 can be connected with various kinds of input devices and output devices which a publicly known computer device available for network connection comprises. Such various kinds of input devices may include, for example, a camera for photographing an image and a GPS (Global Positioning System) receiver for calculating a position. That is, the user terminal 5 may have a photographing function of photographing an image (including a dynamic image) and so-called a GPS function (a function of calculating positional information). They are not shown in the drawings. However, hereinafter, the portable phone 5b is taken as one example of the user terminal having the photographing function and the GPS function.

The storage unit 41 is connected with the control unit 40. The storage unit 41 is configured by, for example, a non-volatility semiconductor storage medium, so as to retain memory without power supply. In the storage unit 41, terminal data 44 and a terminal program 45 are stored. The terminal program 45 is a computer program necessary for the user terminal 5 to accept the Web service provided by the center server 2. When the control unit 40 reads and executes the terminal program 45, the control unit 40 provides a Web service processing portion 46 therein.

The Web service processing portion 46 executes, for example, various kinds of processing necessary for a user to use the Web service by cooperating with the Web service managing portion 17 of the center server 2. As one example of such Web service, the Web service processing portion 46 executes various kinds of processing necessary for providing the dynamic-image delivery service. Besides that, for example, the Web service processing portion 46 executes various kinds of well-known processing necessary for providing the Web service and the like. The Web service processing portion 46 is a logical device realized by a combination of computer hardware and a computer program. Besides that, various kinds of logical devices can be provided in the control unit 40. However, they are not shown in the drawings.

On the other hand, the terminal data 44 is various kinds of data which can be referenced while the terminal program 45 is being executed. For example, the terminal data 44 may include ID management data 18. As one example, at least one part of the ID management data 18 is provided from the center server 2 so that a necessary part is included. Besides that, the terminal data 44 can include various kinds of data necessary for providing the Web service. However, those explanations and illustrations are omitted.

Next, the music game provided by the game machine GM will be described. The music game is a game such that each timing when an appropriate game-play action should be performed is indicated according to a music tune, and in a case that the appropriate game-play action is performed, the timing when the game-play action has been performed is evaluated. More specifically, the music game is a music game such that dance motions performed by a user according to rhythm of music are evaluated. That is, as the appropriate game-play action, an appropriate dance motion (a posture such as a position and direction of each portion, and the like) is evaluated. As one example, each game machine GM provides a game opportunity to play such a music game each time when a predetermined counter value is consumed.

Figure 3:
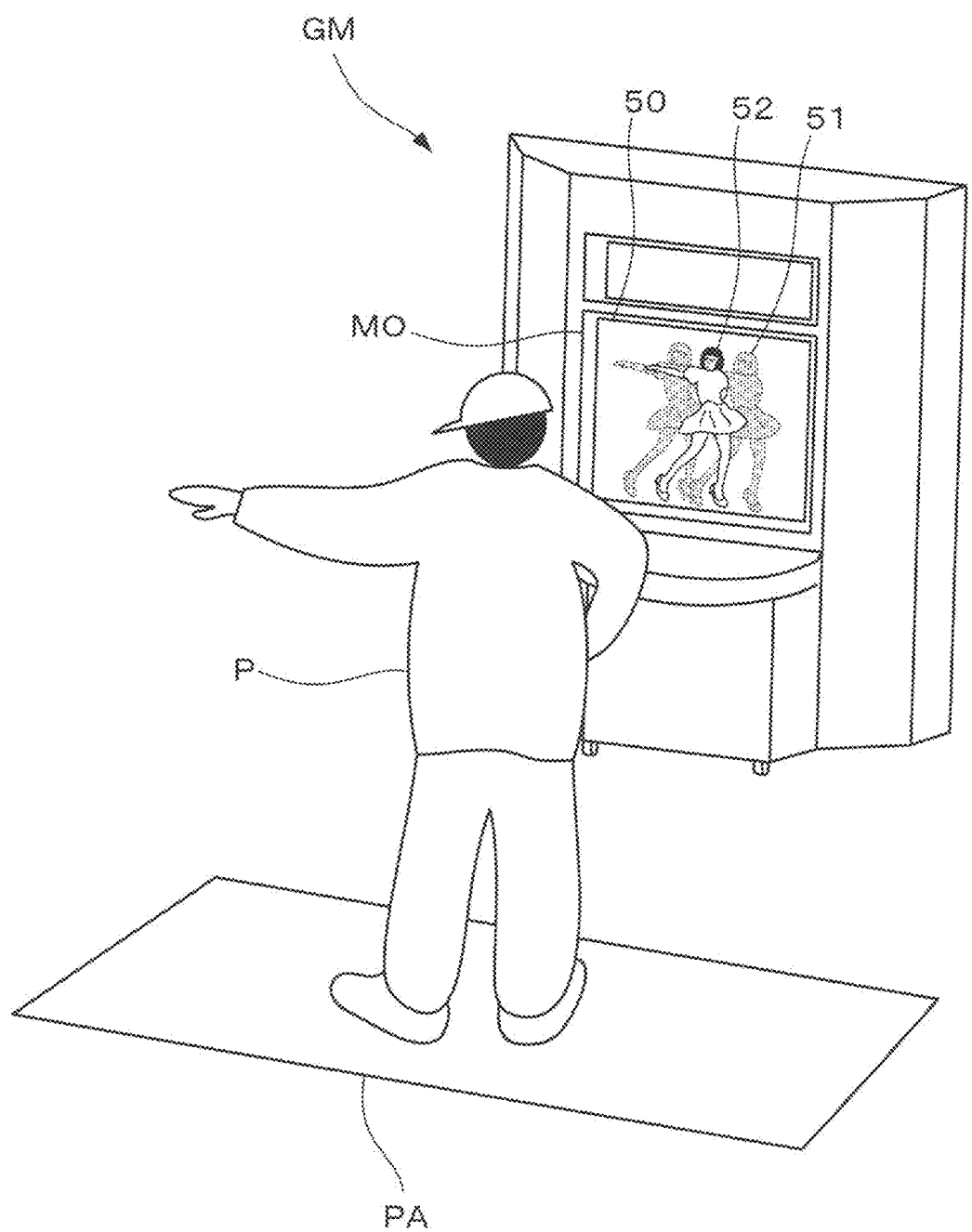
FIG. 3 is a diagram schematically showing one example of a game machine providing a music game and a user playing the music game.

FIG. 3 is a diagram schematically showing one example of the game machine GM which is being providing the music game and a user who is being playing the music game. As shown in FIG. 3, each game machine GM is provided with a monitor MO. On the monitor MO, a game screen 50 is displayed. That is, in each game opportunity, the music game is played via the game screen 50.

The game screen 50 includes, for example, two silhouette images 51 and a user character image 52. The user character image 52 is an image for re-acting dancing motions of the user (hereinafter, the user playing the music game is sometimes referred to as a performer P) in the game. The dancing motion of the performer P is, for example, detected by the mentioned state detector, and re-enacted in the game as the dancing motion of the user character image 52.

Each of the silhouette images 51 is an image for indicating appropriate dancing motion (posture) to the performer P. The two silhouette images 51 shows the same posture as each other, as one part of the dancing motion. More specifically, each of the silhouette images 51 shows a particular same posture which the user character image 52 should shows. As one example, the two silhouette images 51 show up on both sides of the user character image 52 respectively, and move at the same time toward the user character image 52 so as to overlap with the user character image 52. The timing when the silhouette images 51 overlap with the user character image 52 is an appropriate timing when the performer P should perform the dancing motion. That is, for the performer P, in addition to an appropriate posture of dancing motion indicated by the silhouette images 51, an appropriate timing when the performer P should perform the posture is indicated by the overlap of them. The actual dancing motion performed by the performer P according to the images 51 is re-enacted in the game as the dancing motion of the user character image 52. Further, a degree of coincidence (the posture of the performer P and the timing) between each silhouette image 51 and the user character image 52 is evaluated. Specifically, as the degree of coincidence between the silhouette image 51 and the user character image 52 gets higher, the evaluation gets also higher.

On the other hand, a game-play area PA is provided at a predetermined position in the front (a display direction of the monitor MO) area of each game machine GM. The game-play area PA is an area where the performer P performs dancing motion as the game-play action. The game-play area PA is arranged at an appropriate position where the state detector can detect the state of the performer P (the person being detected). That is, when the dancing motion is performed by the performer P in the game-play area, thereby the dancing motion is appropriately detected.

In the example shown in FIG. 3, the posture of each silhouette image 51 and the posture of the user character image 52 coincide with each other. That is, the performer P is performing the appropriate posture of the dancing motion. Each silhouette image 51 is placed at a position immediately before a position where the image 51 overlaps with the user character image 52. Accordingly, if the posture is maintained until the moment when each silhouette image 51 and the user character image 52 overlap with each other, an evaluation that an appropriate dancing motion has been performed at an appropriate timing is obtained. As one example, each game machine GM provides such a music game.

Next, details of one example of the dynamic-image delivery service will be described. The dynamic-image delivery service is a service that, as one example, delivers to a personal computer 5a, various kinds of dynamic images relating to a game. As one example, the dynamic-image delivery service delivers a dynamic image by the streaming system. In the dynamic-image delivery service, as one example of the various kinds of dynamic images, a gaming dynamic image is delivered. The gaming dynamic image is a dynamic image corresponding to the game screen 50 shown during game-play. More specifically, the game screen changes during game-play as appropriate. The gaming dynamic image is a dynamic image showing such a change of the game screen, that is, a change state of the game screen changing over time during game-play. As one example, such a gaming dynamic image is generated by the encoder EC of each game machine GM, and provided to the center server 2.

Further, in the dynamic-image delivery service, as one example, a composite dynamic image is also delivered, the composite dynamic image where at least one dynamic image photographed by each portable phone 5b is synthesized. More specifically, within dynamic images photographed by the portable phone 5b, playing dynamic image where the performer playing the game is photographed is used for making the composite dynamic image. In the dynamic-image delivery system, as one example, the composite dynamic image where the playing dynamic image and the gaming dynamic image are synthesized is delivered using the streaming system. As one example, the composite dynamic image is divided into a plurality of frame dynamic images at a predetermined time interval, and delivered for each frame dynamic image to each personal computer 5a so as to be reproduced sequentially. Then, the composite dynamic image is generated by a group of frame dynamic images in time series. As one example, in the dynamic-image delivery service, the composite dynamic image is delivered by such a streaming system.

Figure 4:
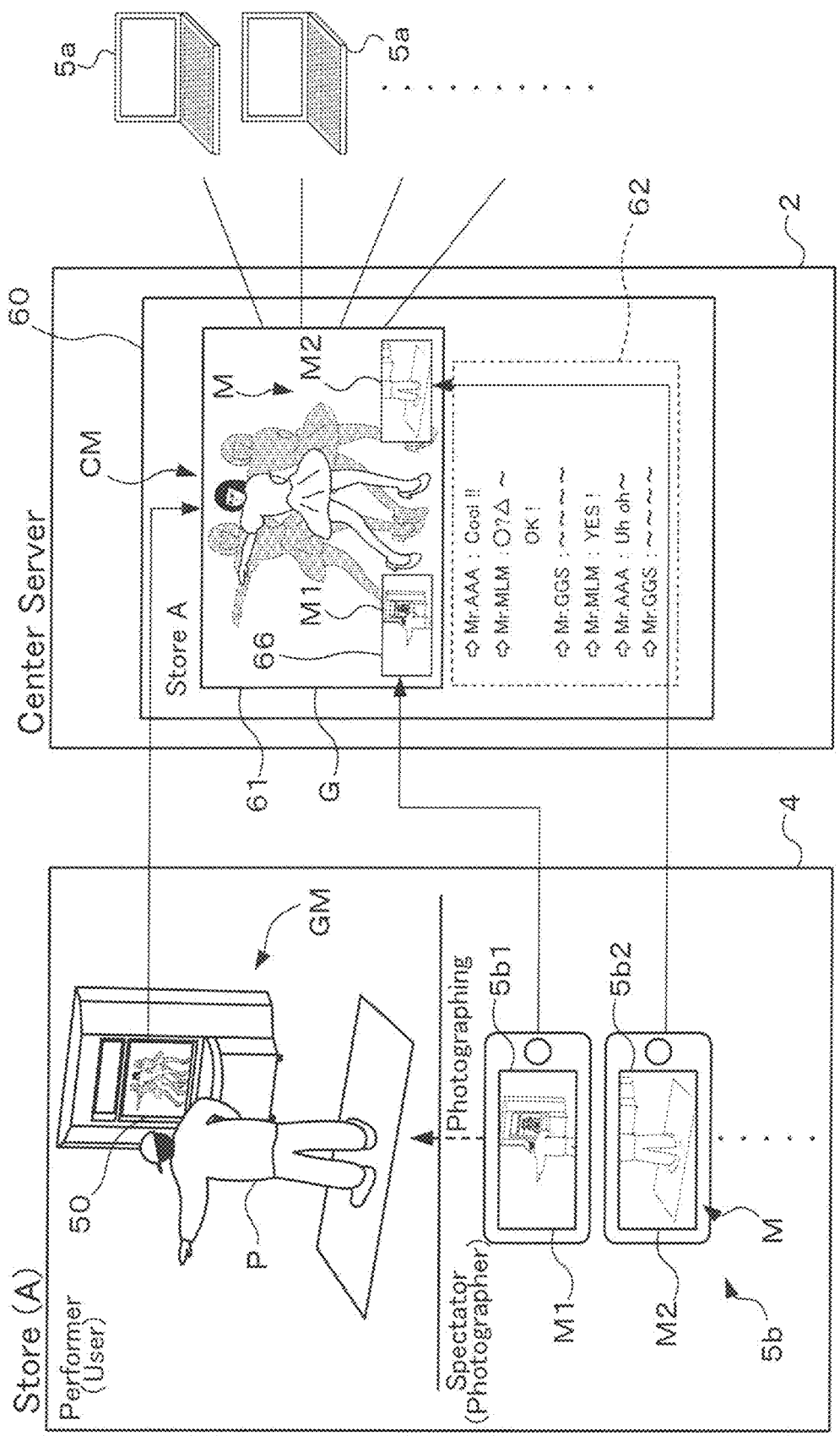
FIG. 4 is an explanatory diagram for explaining one example of the dynamic-image delivery service by which a composite dynamic-image where a gaming dynamic image and a playing dynamic image are synthesized is delivered.

The delivery of a composite screen will be further described in reference to FIG. 4. FIG. 4 is an explanatory diagram for explaining one example of the dynamic-image delivery service that a composite dynamic image where gaming dynamic image and playing dynamic image are synthesized is delivered. As shown in FIG. 4, as the dynamic-image delivery service, a delivery screen 50 as the composite dynamic image is provided to each personal computer 5a via the center server 2. The delivery screen 60 includes a dynamic image region 61 and a chat region 62.

The chat region 62 is a region which is used as a site for opinion exchange for users of the personal computers 5a. More specifically, in the chat region 62, for example, an opinion of each user, which is provided via each personal computer 5a, is displayed.

On the other hand, the dynamic image region 61 is a region for displaying the composite dynamic image. Accordingly, in the dynamic region 61, the composite dynamic image CM (including the frame dynamic images) is displayed sequentially (in FIG. 4, the composite dynamic image CM is shown as a still image because of the characteristic of the drawing. Hereinafter, the same applies to each drawing and each dynamic image.) The composite dynamic image CM is generated by a synthesis of each gaming dynamic image G and each playing dynamic image M as the terminal dynamic image. Further, as one example, each gaming dynamic image G and each playing dynamic image M are synthesized so that the gaming dynamic image G is displayed as main dynamic image and the playing dynamic images M is displayed as subsidiary dynamic image.

Specifically, the gaming dynamic image G is displayed in all over the dynamic image region 61, while the playing dynamic image M is displayed in a part of the dynamic image region 61. That is, a display region 66 of the playing dynamic image M is provided in a display region of the gaming dynamic region G (corresponding to the dynamic image region 61). And, both of the gaming dynamic image G and the playing dynamic image M are displayed so that the playing dynamic image M functions as a part of the gaming dynamic image G. That is, the playing dynamic image M is synthesized with the gaming dynamic image G so as to function as so-called wiping dynamic image. As one example, the composite dynamic image CM, where the gaming dynamic image G and the playing dynamic image M are synchronized so as to be displayed in this way, is displayed in the dynamic image region 61.

Further, as one example, in order to realize the streaming delivery, each gaming dynamic image G is divided into a plurality of frame dynamic images and each playing dynamic image M is also divided into a plurality of frame dynamic images, and the dynamic images G and M are provided in a unit of the frame dynamic image, from each game machine GM or each portable phone 5b to the center server 2. Specifically, the game machines GM are used by performers P at the stores 4 respectively. The center server 2 acquires change of the game screen 50 displayed to the performer P playing the game from each game machine GM, as the frame dynamic images sequentially in time series. And then by a collection of such frame dynamic images, the gaming dynamic image G is generated.

On the other hand, at each store 4, generally, a lot of spectators are likely to be formed around the performer P. Further, each of the spectators generally often owns his/her portable phone 5b. As one example, the playing dynamic image M photographed by such a portable phone 5b is used as a target to be synthesized. The center server 2 acquires the photographed playing dynamic image M from the portable phone 5b, as the frame dynamic images sequentially at a predetermined time interval. And then, by a collection of such frame dynamic images, the playing dynamic image M is generated.

In the example shown in FIG. 4, the playing dynamic image M includes a first playing dynamic image M1 and a second playing dynamic image M2. More specifically, the center server 2 acquires: the first playing dynamic image M1 as a playing dynamic image M photographed by a first portable phone 5b1 within the portable phones 5b owned by the spectators; and the second playing dynamic image M2 as a playing dynamic image M photographed by a second portable phone 5b2 within the portable phones 5b owned by the spectators. And then, the center server 2 generates the composite dynamic image CM where the playing dynamic images M1 and M2 are arranged at left and right lower portions in the gaming dynamic image G as the wiping dynamic images respectively.

The composite dynamic image CM is generated, as one example, by the frame dynamic images of the playing dynamic images M1, M2 and the gaming dynamic image G, the frame dynamic images corresponding to the same time. That is, the composite dynamic image CM is generated so that the playing dynamic images M1 and M2 and the gaming dynamic image G are synchronized with each other with respect to elapse of time. For such synchronization, for example, actual time (e.g., absolute time such as "12:00") measured by each game machine GM or each portable phone 5b may be used as a reference. Alternatively, in a case that, by using the actual time when the photographing starts as a reference, elapsed time (relative time) from the reference is given to each frame dynamic image, the actual time and the elapsed time may be used for the synchronization. As a result, the composite dynamic image CM where the gaming dynamic image G and the playing dynamic image M are synchronously reproduced is generated. And then, the center server 2 delivers such a composite dynamic image CM. That is, via the delivery screen 60 including such a composite dynamic image CM, at each personal computer 5a, each frame dynamic image of the gaming dynamic image G and each frame dynamic image of the playing dynamic image M, which correspond to the same period as each other, are displayed together at the same time. Further, as one example, such a composite dynamic image CM is streamed to each personal computer 5a in almost real time. That is, when the center server 2 acquires the frame dynamic image corresponding to the same period with respect to the gaming dynamic image G and the playing dynamic image M, without a break (before acquiring all of the frame dynamic images), the center server 2 provides to each personal computer 5a, the delivery screen 60 including the acquired frame dynamic images sequentially. As one example, in the dynamic-image delivery service, such a composite dynamic image CM is delivered via the delivery screen 60.

One example of a determination method of gaming dynamic image and playing dynamic image as targets to be synthesized will be described in reference to FIG. 5. The gaming dynamic image G is generated for each game provided by each game machine GM. The same applies to each playing dynamic image M. In this example, each playing dynamic image M is provided from each portable phone 5*b*. Accordingly, to the center server 2, a plurality of gaming dynamic images G and a plurality of playing dynamic image M are provided as the targets to be synthesized and stored at least temporarily. After that, the targets to be synthesized are determined from the gaming dynamic images G and the playing dynamic images M, and thereby the gaming dynamic image G and the playing dynamic image M which are related to each other are synthesized.

Figure 5:
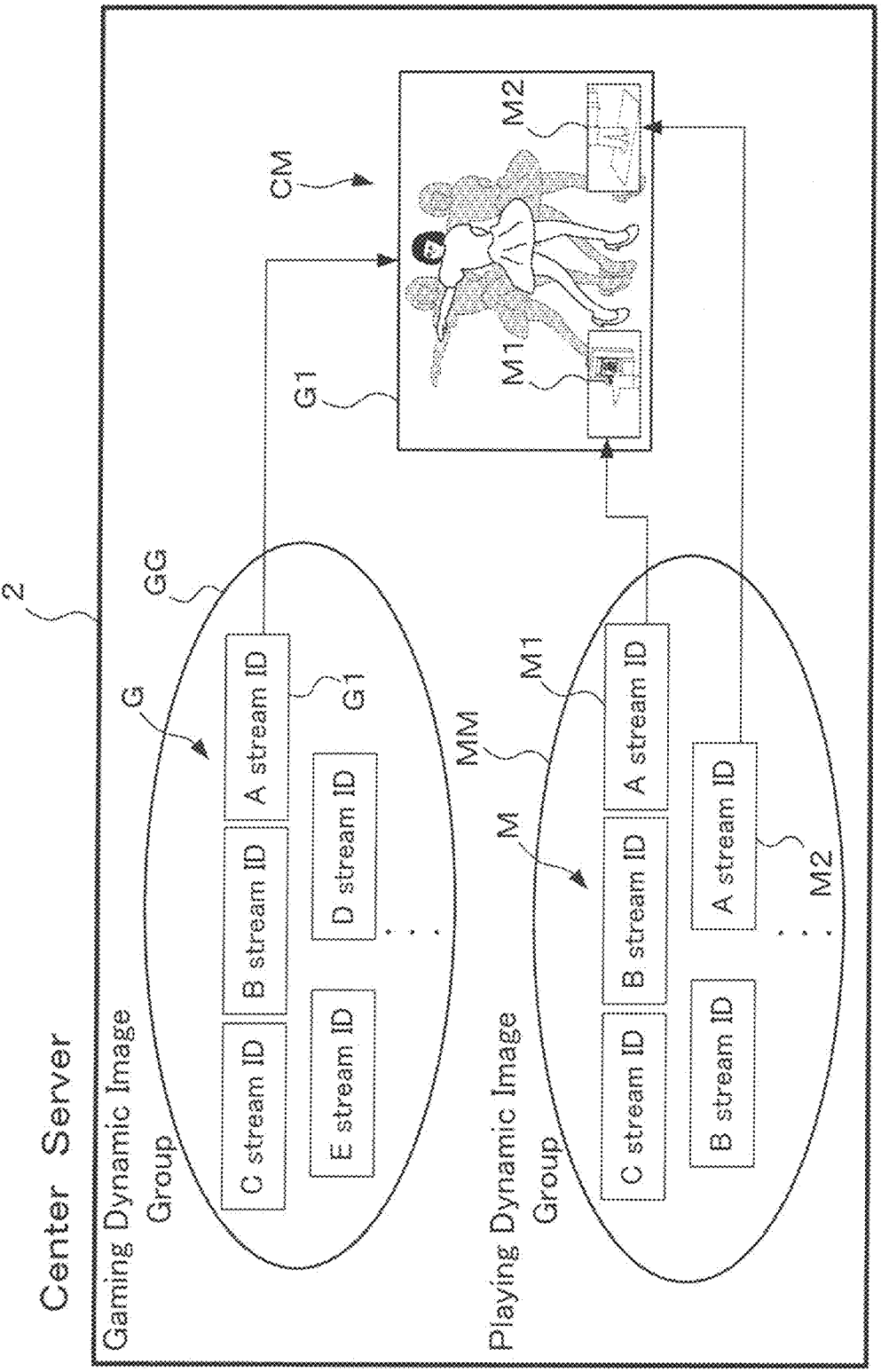
FIG. 5 is an explanatory diagram for explaining one example of a determination method for the gaming dynamic image and the playing dynamic image, which are targets to be synthesized.

FIG. 5 is an explanatory diagram for explaining one example of the determination method of the gaming dynamic image G and the playing dynamic image M as the targets to be synthesized. As shown in FIG. 5, in the center server 2, the gaming dynamic images G which are the targets to be synthesized are stored as a gaming dynamic image group GG, each gaming dynamic image G being associated with a stream ID as dynamic image identification information. The stream ID is information for identifying each gaming dynamic image G from each other. That is, the stream ID is an ID unique for each gaming dynamic image G. Similarly, in the center server 2, the playing dynamic images M which are the targets to be synthesized are stored as a playing dynamic image group MM, each playing dynamic image M being associated with the stream ID common with the corresponding gaming dynamic image G. The gaming dynamic image G and the playing dynamic image M which have the common stream ID are determined to be synthesized.

In the example in FIG. 5, the gaming dynamic image group GG includes an A gaming dynamic image G1 associated with "A stream ID". Similarly, the playing dynamic image group MM includes the first playing dynamic image M1 and second playing dynamic image M2 both being associated with the "A stream ID". In this case, the gaming dynamic image G1 and the two playing dynamic images M1 and M2 are determined as the targets to be synthesized. After that, the images G1, M1 and M2 are synthesized to generate the composite dynamic image CM. In this case, the A gaming dynamic image G1 having the common stream ID with the playing dynamic images M1 and M2 functions as a target dynamic image.

Figure 6:
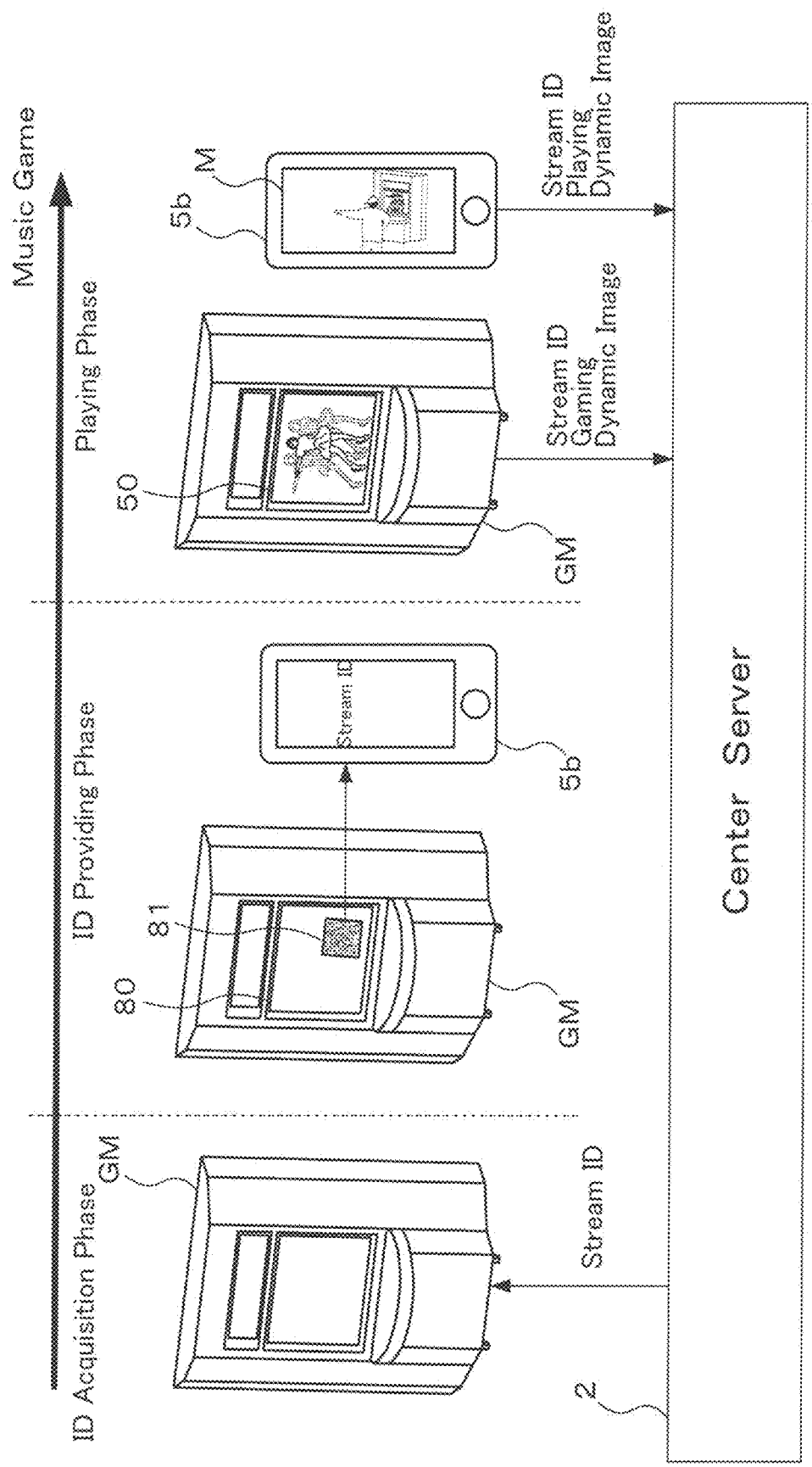
FIG. 6 is an explanatory diagram for explaining one example of each phase included in the music game

The stream ID associated with each gaming dynamic image G and each playing dynamic image M will be described in reference to FIG. 6. FIG. 6 is an explanatory diagram for explaining one example of each phase included in the music game. As shown in FIG. 6, the music game includes, for example, an ID acquisition phase, an ID providing phase, and a playing phase in sequence.

The ID acquisition phase is a phase for allowing each game machine GM to acquire the stream ID. Specifically, each game machine GM is allowed to acquire the stream ID from the center server 2. That is, as one example, the stream ID is given for each game-playing by the center server 2. Accordingly, the stream ID is given so as to be different from each other for each game opportunity to play the game.

Next, the ID providing phase is a phase for providing the stream ID acquired in the ID acquisition phase to each portable phone 5*b*. For example, in the ID providing phase, each game machine GM provides the acquired stream ID to each portable phone 5*b*. Specifically, as one example, the stream ID is provided to each portable phone 5*b* via the ID providing screen 80. The ID providing screen 80 includes a two-dimensional code image 81. The two-dimensional code image 81 is an image of a two-dimensional code formed in accordance with a predetermined standard so as to include information of the stream ID. Each portable phone 5*b* acquires the information of the stream ID via the two-dimensional code image 81. That is, each portable phone 5*b* reads out the two-dimensional code image 81, and acquires the information of the stream ID included there. As one example, each portable phone 5*b* reads the image 81 by using an application (software) for delivery service.

Subsequently, the playing phase is a phase for delivering the composite dynamic image CM mentioned above. Specifically, in the playing phase, each game machine GM provides the music game mentioned above. Each game machine GM provides to the center server 2, the gaming dynamic image G showing the change of the game screen 50 of the music game being played with the stream ID indicating this game opportunity.

On the other hand, each portable phone 5*b*, as one example, photographs each playing dynamic image M via the application for delivery service. The application for delivery service provides the photographing result as the playing dynamic image M. Specifically, the application for delivery service provides to the center server 2, the playing dynamic image M which has been photographed, together with the stream ID acquired at the ID providing phase. As a result, in the center server 2, each gaming dynamic image G and each playing dynamic image M are stored in association with the stream ID common among them. And then, in the center server 2, as mentioned above, by using the common stream ID as a key, the gaming dynamic image G and the playing dynamic image M corresponding to the gaming dynamic image G are determined and synthesized. As one example, the stream ID is associated with each gaming dynamic image G and each playing dynamic image M in the above mentioned way. Further, as one example, each portable phone 5*b* functions, via the application for delivery service, as a photography-use terminal of the present invention.

The restriction of a part of playing dynamic images M will be explained in reference to FIG. 7. As mentioned above, a plurality of playing dynamic images M are provided by a plurality of portable phones 5*b*. It could happen that the playing dynamic images M of the same performer P are photographed by a plurality of spectators in the same game opportunity at the same store 4. Due to this, there is a possibility that a lot of playing game images M are associated with one gaming dynamic image G. Accordingly, the playing dynamic images M as the targets to be synthesized with each gaming dynamic image G are restricted by restrictive conditions.

Figure 7:
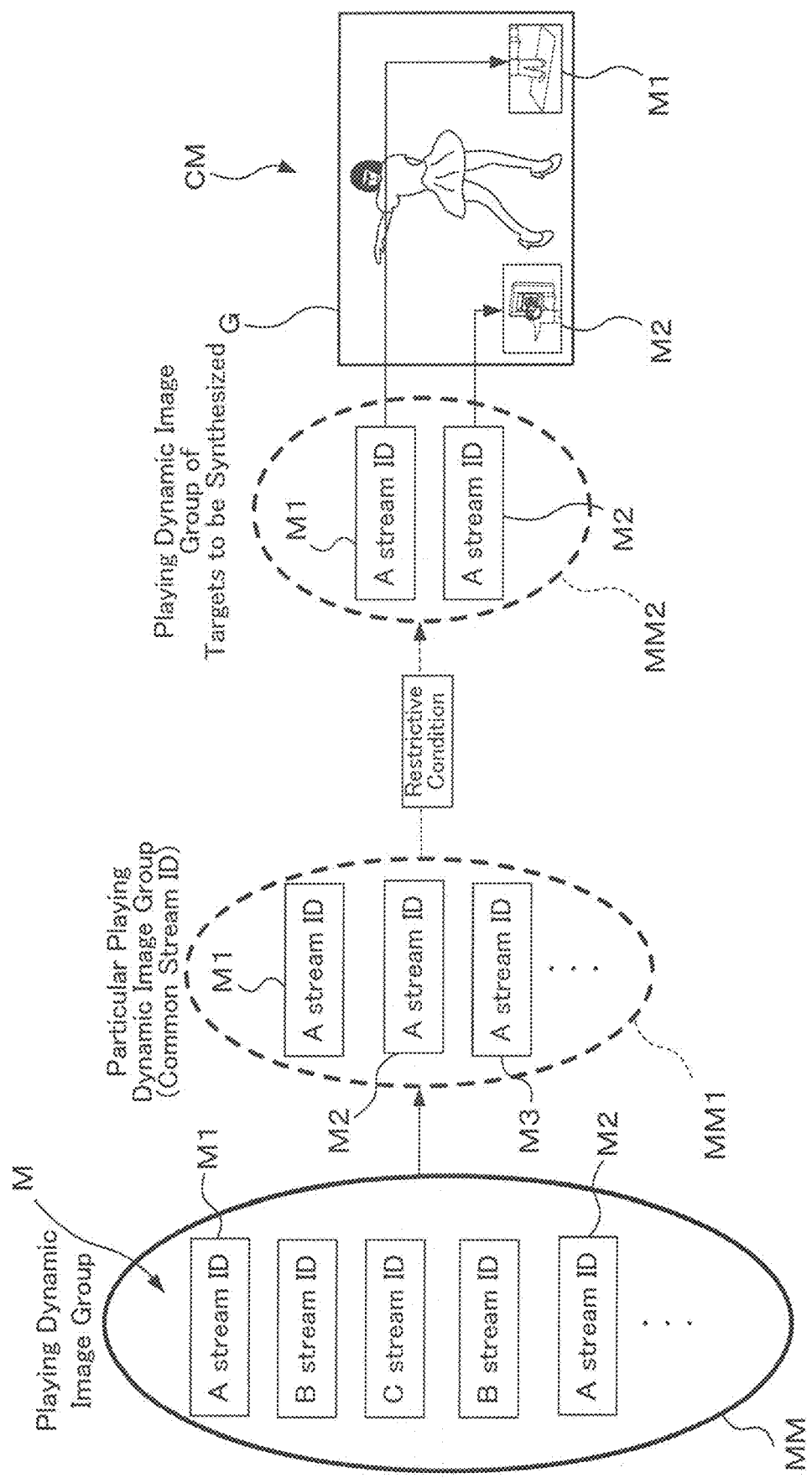
FIG. 7 is an explanatory diagram for explaining one example of restriction of a part of the playing dynamic images

FIG. 7 is an explanatory diagram for explaining one example the restriction of a part of playing dynamic images M. As shown in FIG. 7, the playing dynamic image group MM includes a lot of playing dynamic images M associated with the same common stream ID. On the other hand, a particular playing dynamic image group MM1 which is formed by such playing dynamic images M may include any dynamic images inappropriate to the synthesis with a gaming dynamic image G. Accordingly, it is restricted to use, within the particular playing dynamic image group MM1, inappropriate dynamic images (at least, dynamic images having a high possibility to be inappropriate) for the synthesis with a gaming dynamic image G. Specifically, the particular playing dynamic image group MM1 are narrowed down based on the restrictive conditions, to a playing dynamic image group MM2 for the targets to be synthesized, at the moment when a composite dynamic image CM is generated, the playing dynamic image group MM2 not including dynamic images having a high possibility to be inappropriate. And then, each composite dynamic image CM is generated by synthesizing each playing dynamic image M of the mentioned playing dynamic image group MM2 for the targets to be synthesized and each gaming dynamic image G.

In the example in FIG. 7, the playing dynamic image group MM includes, as the particular playing dynamic image group MM1, the first playing dynamic image M1 to a third playing dynamic image M3, for example. On the other hand, the playing dynamic image group MM2 for the targets to be synthesized does not include the third playing dynamic image M3. That is, the third playing dynamic image M3 is determined based on the restrictive conditions as the dynamic image having a high possibility to be inappropriate, and thereby, the use thereof is restricted. In this way, using the restrictive conditions as a criterion, it is restricted to use a part of the playing dynamic images M.

Figure 8:
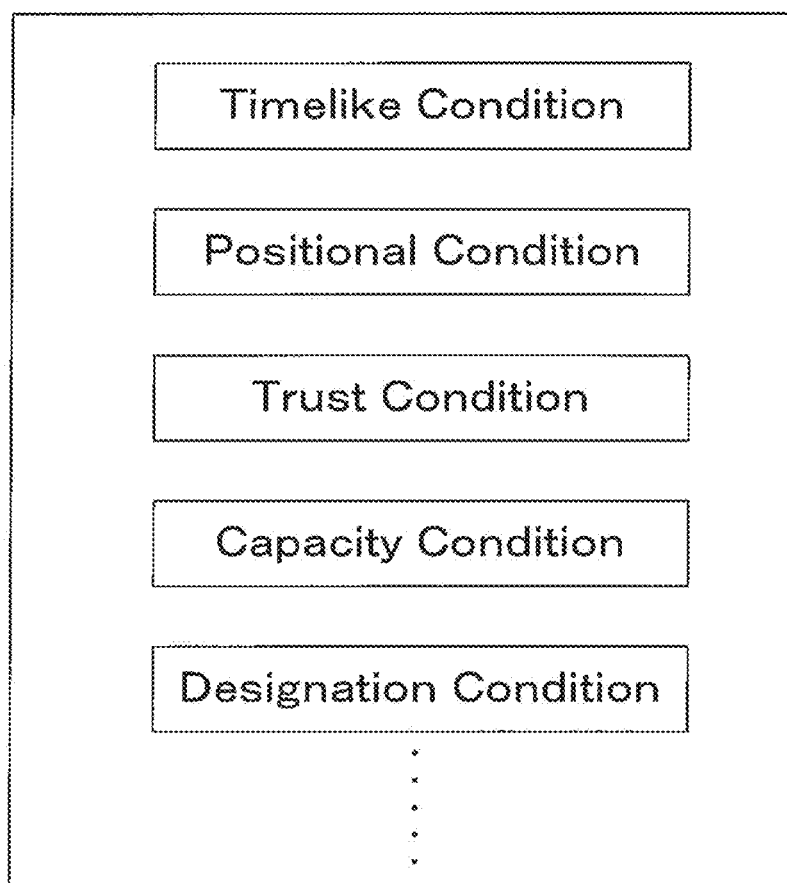
FIG. 8 is an explanatory diagram for explaining one example of a restrictive condition

FIG. 8 is an explanatory diagram for explaining one example of the restrictive conditions. As shown in FIG. 8, the restrictive conditions include, for example, a timelike condition, a positional condition, a trust condition, a capacity condition, and a designation condition. For example, when any one of the timelike condition, the positional condition, the trust condition, the capacity condition, and the designation condition is satisfied, it is determined that the restrictive conditions are satisfied. Although the restrictive conditions can include further various conditions, the illustrations and explanations thereof are omitted.

The timelike condition includes, for example, photographing time or acquisition time as a requirement. That is, in the timelike condition, as one example, the photographing time or the acquisition time is used as a criterion for inappropriateness. For example, the timelike condition is satisfied in a case the photographing time or the acquisition time of each playing dynamic image M does not belong to a predetermined time range. Specifically, for example, the timelike condition including the photographing time as a requirement is satisfied, in a case that, as one example, the photographing time is greatly deviated from game-playing time corresponding to each gaming dynamic image G. That is, in this case, as one example, it is restricted to use each playing dynamic image M whose photographing time deviates to a degree that it is impossible to suppose that the performer P corresponding to each gaming dynamic image G was photographed. The dynamic image whose photographing time greatly deviates from the game-playing time has a high possibility that there is no relation with the performer P. Further, to begin with, such a dynamic image also has a high possibility not to function as the playing dynamic image M. Or, there is a possibility that the actual time measured by each portable phone 5b is deviated. In this case, there is a high possibility that each playing dynamic image M is not appropriately synchronized with each gaming dynamic image G. By the timelike condition having the requirement of photographing time, it is restricted to use the inappropriate dynamic images mentioned above.

Similarly, for example, the timelike condition having a requirement of the acquisition time is satisfied, in a case that the acquisition time is a predetermined time point elapsed from a game-play start time (a start time of each gaming dynamic image G), or later. For example, in a case that the streaming delivery is being executed in real time, a delay of acquisition means a deviation between each gaming dynamic image G and each playing dynamic image M. That is, in this case, as one example, it is restricted to use each playing dynamic image M which makes a deviation for a predetermined time or more from each gaming dynamic image G. By the timelike condition having a requirement of the acquisition time, it is restricted to use the dynamic image which could make such a deviation.

The positional condition includes, for example, a requirement of a photographing location. That is, in the positional condition, as one example, the photographing location is used as a criterion for inappropriateness. For example, the positional condition is satisfied in a case that the photographing location does not belong to a predetermined positional range. Specifically, as one example, the positional condition is satisfied, in a case that the photographing location is different from a location corresponding to each store 4. Further, as one example, the positional condition may be satisfied, in a case that the photographing location of each playing dynamic image M is not a location of the store 4 where the game machine GM providing the corresponding gaming dynamic image G has been installed. That is, in this case, in a case that it is restricted to use each playing dynamic image M whose photographing location deviates from the store 4 where the corresponding game machine GM has been installed. For example, there is a case that, after the stream ID is acquired, a dynamic image photographed at a different location is provided from each portable phone 5b. Such a dynamic image is inappropriate for the playing dynamic image M. As one example, by the positional condition having a requirement of a photographing location, it is restricted to use such an inappropriate dynamic image.

The trust condition includes, for example, a requirement of the user ID as user identification information. That is, in the trust condition, as one example, the user ID is used as a criterion for inappropriateness. The user ID is information for identifying each user. For example, the trust condition is satisfied, in a case that the user ID of a user who photographed the playing dynamic image M is not included in particular user ID data. Or, contrarily, the trust condition may be satisfied in a case that the user ID of a user who photographed the playing dynamic image M is included in the particular user ID data. The particular user ID data is data prepared in advance. More specifically, as the particular user ID data, for example, data holding user IDs of users having high trust is used, or contrarily, data holding user IDs of users having low trust is used. That is, in this case, it is restricted to use each playing dynamic image M provided by the users having low trust, by using the user IDs in the particular user ID data as a criterion. Generally, the users having high trust (each having a high possibility to provide an appropriate playing dynamic image M), or the users having low trust (each having a low possibility to provide an appropriate playing dynamic image M) are very likely to be fixed. By the trust condition having a requirement of the user ID of the particular user ID data, it is restricted to use a dynamic image by the users having low trust as mentioned above. Or, a dedicated user ID may be prepared for photographing each playing dynamic image M. That is, in a case that each user photographs the playing dynamic image M which is the target to be synthesized, the dedicated user ID (that is, a common user ID) may be used by each user. In this case, this dedicated user ID may be recorded in the particular user ID data. And then, it may be restricted to synthesize the playing dynamic image M corresponding to the user ID other than the dedicated user ID.

The capacity condition includes, for example, a requirement of a capacity of each playing dynamic image M, an acceptable range or an acceptable number of pieces for synthesis of playing dynamic images M, or a processing capacity for synthesis. That is, in the capacity condition, as one example, the capacity of each playing dynamic image M, the acceptable range or the acceptable number of pieces for synthesis of playing dynamic images M, or the processing capacity is used as a criterion for inappropriateness. For example, the capacity condition is satisfied, in a case that the capacity of each playing dynamic image M is more than a predetermined capacity. That is, in this case, it is restricted to use each playing dynamic image M whose capacity is more than the predetermined capacity. In consideration of a communication capacity (for each unit time) of the network 3, a processing capacity of each personal computer 5*a*, or the like, in a case that the playing dynamic image M whose capacity is more than the predetermined capacity is used, this case could course display delay and the like, and thereby there is a possibility that appropriate display is not provided. By the capacity condition having a requirement of the capacity of each playing dynamic image M, it is restricted to use the dynamic image having a possibility that the appropriate display is not provided as mentioned above.

Further, for example, in a case that each playing dynamic image M is specified as the target to be synthesized sequentially in accordance with a predetermined regulation, the capacity condition is satisfied by such a playing dynamic image M that lies beyond the acceptable range or the acceptable number of pieces for synthesis, or the processing capacity for synthesis. That is, in this case, so that the playing dynamic images M as the targets to be synthesized are within the acceptable range or the acceptable number of pieces for synthesis, or the processing capacity for synthesis, it is restricted to use each playing dynamic image M being beyond them. For example, as long as the display region 66 for each playing dynamic image M is not made to be smaller, a displayable range of the delivery screen 60, or the number of pieces displayable in the delivery screen 60 has a limit. In a case that such a limit is exceeded, there is a high possibility that the playing dynamic images M are not synthesized appropriately. Similarly, as mentioned above, the processing capacity of each of the network 3, the center server 2, and the game machine GM has a limit. In a case that such a processing capacity is exceeded, high load is applied to the network 3 and the like too much, and thereby there is a high possibility that appropriate processing is not provided. By the capacity condition having a requirement of the acceptable range or the acceptable number of pieces for synthesis, or the processing capacity for synthesis, it is restricted to use the dynamic image having a high possibility that appropriate synthesis or appropriate processing is not provided.

The designation condition includes, for example, a requirement of the user ID, similarly to the trust condition. Or, the designation condition may include a requirement of a main dynamic image ID and a subsidiary dynamic image ID. The main dynamic image ID is information for specifying each gaming dynamic image G, and the subsidiary dynamic image ID is information for specifying each playing dynamic image M. That is, in the designation condition, the user ID or the like above mentioned are used as a criterion for inappropriateness. Specifically, before the delivery screen 60 is provided, a list screen where each playing dynamic image M as the target to be synthesized is listed may be provided. Further, each playing dynamic image M as the target to be synthesized may be designated though the list screen by a user of each personal computer 5*a*. And, as one example, the designation condition may be satisfied, by the subsidiary dynamic image IDs other than the subsidiary dynamic image IDs of the playing dynamic images M designated, or user IDs of users other than the users who have provided the designated playing dynamic images M. That is, in this case, it is restricted to use playing dynamic images M other than the playing dynamic images M designated by a user. There is a case that a playing dynamic image M preferable as the target to be synthesized is different depending on each user. In this case, there is a possibility that playing dynamic images M other than playing dynamic images M preferable as the target to be synthesized for a user, are inappropriate for the user. By the designation condition having a requirement of the designated user ID, it is restricted to use the playing dynamic images M not preferable for each user as mentioned above. The same applies to a case that each gaming dynamic image G is designated.

Next, details of the ID management data 18, the main dynamic image data 19, the subsidiary dynamic image data 20, and the composite dynamic image data 21 will be described. The ID management data 18 is data for managing various kinds of IDs such as the user ID. The ID management data 18 may be used for managing the stream ID, mentioned above, as one of the various kinds of IDs. That is, the stream ID and the like which have been issued may be managed by the ID management data 18. Further, the ID management data 18 may be used for managing a chassis ID which is chassis identification information for identifying each game machine GM. Similarly, the ID management data 18 may be used for managing a store ID for identifying each store 4. In this case, each store ID may be managed in association with facility positional information indicating the location of the corresponding store 4. Further, each store ID may be managed in association with the chassis ID of each game machine GM installed in the corresponding store 4. That is, the ID management data 18 may be used for managing the location of each store 4, and each game machine GM installed in each store 4. Further, the ID management data 18 may include the particular user ID data. In this case, the ID management data 18 functions as particular user data of the present invention.

Figure 9:
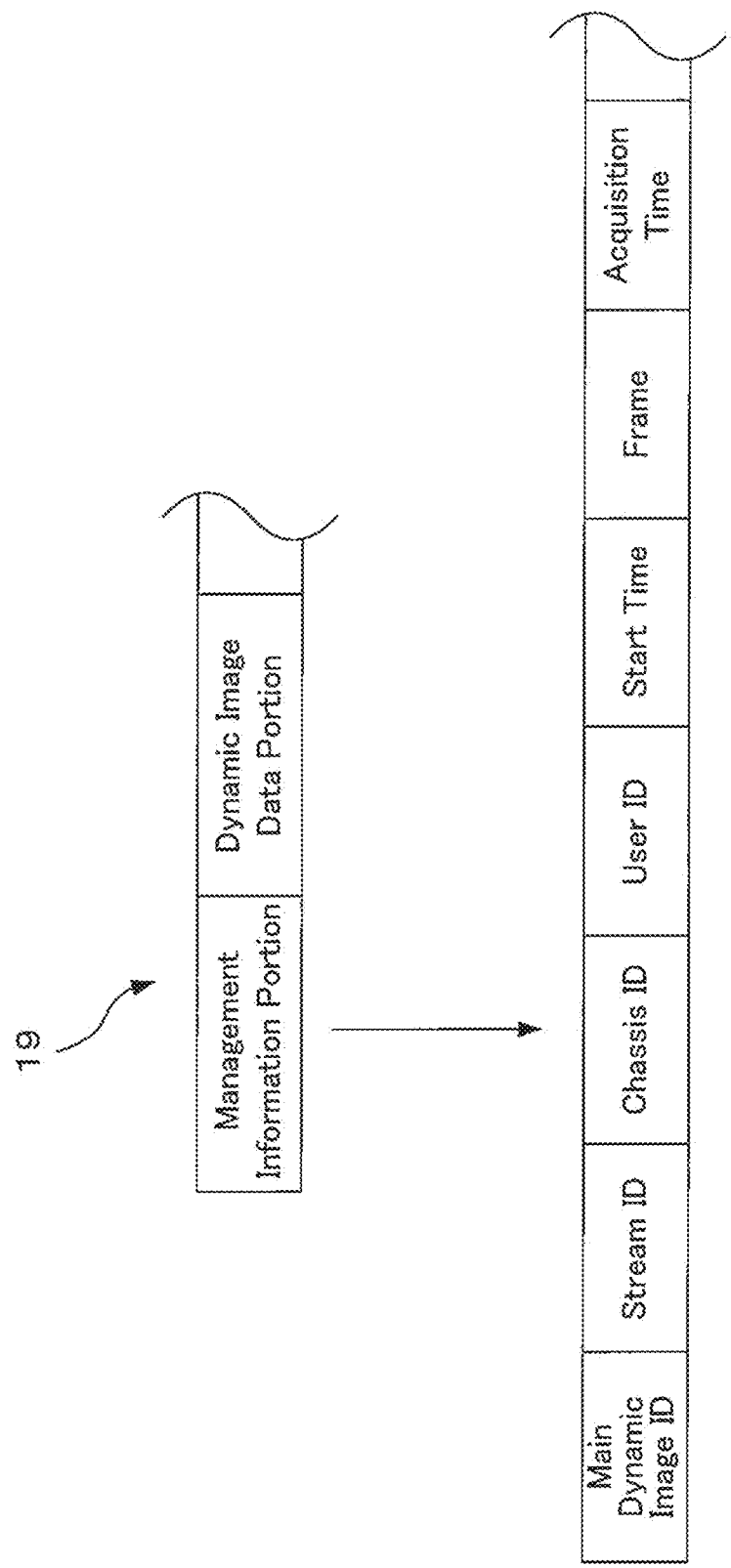
FIG. 9 is a diagram showing one example of contents of main dynamic image data

The main dynamic data 19 is data for representing each gaming dynamic image G. FIG. 9 is a diagram showing one example of contents of the main dynamic data 19. As shown in FIG. 19, the main dynamic data 19 includes a management information portion and a dynamic image data portion. The dynamic image portion is dynamic image data for representing each gaming dynamic image G. That is, the dynamic image data for representing each gaming dynamic image G is managed in association with the management information portion by the main dynamic image data 19.

The management information portion is a part where management information for managing each gaming dynamic image G is recorded. The management information portion includes information of: for example, the main dynamic image ID; the stream ID; the chassis ID; the user ID; the start time; the frame; and the acquisition time.

The main dynamic image ID is the information for specifying each gaming dynamic image G as mentioned above. Accordingly, as the main dynamic image ID, an ID unique for each gaming dynamic image G is used. For example, the main dynamic image ID is used for discriminating between each gaming dynamic image G and each playing dynamic image M. Accordingly, as one example of the main dynamic image ID, a combination of discriminative information for discriminating between each gaming dynamic image G and each playing dynamic image M and the stream ID, may be used. In this case, only such discriminative information may be recorded in the management information portion, or the recording of the stream ID, mentioned later, may be omitted. Or, in a case each gaming dynamic image G is specified by the chassis ID and the start time, these kinds of information could function as the main dynamic image ID. That is, the chassis ID may be used as at least one part of the stream ID. In this case, the main dynamic image ID may be omitted.

The stream ID was mentioned above. Similarly, the chassis ID is information for identifying each game machine GM as mentioned above. As the chassis ID, for example, an IP address, a unique machine ID, or the like may be used. The user ID was also mentioned above. Further, as the information of the user ID, for example, information of the user ID of the performer P is recorded. The start time is information indicating the game-play start time, that is, the start time on each gaming dynamic image G. The frame is information for specifying each frame dynamic image when each gaming dynamic image G is divided into a plurality of frame dynamic images. As the information of the frame, information of a number which is given to each frame dynamic image in a time series manner may be used. OR, as the information of the frame, information of time corresponding to each frame dynamic image in each gaming dynamic image G may be used. The acquisition time is information indicating time when the dynamic image data for representing each gaming dynamic image G (including each frame dynamic image) is acquired. As one example, the management information portion is configured as collected records, each record having the mentioned kinds of information so as to be associated with each other.

Figure 10:
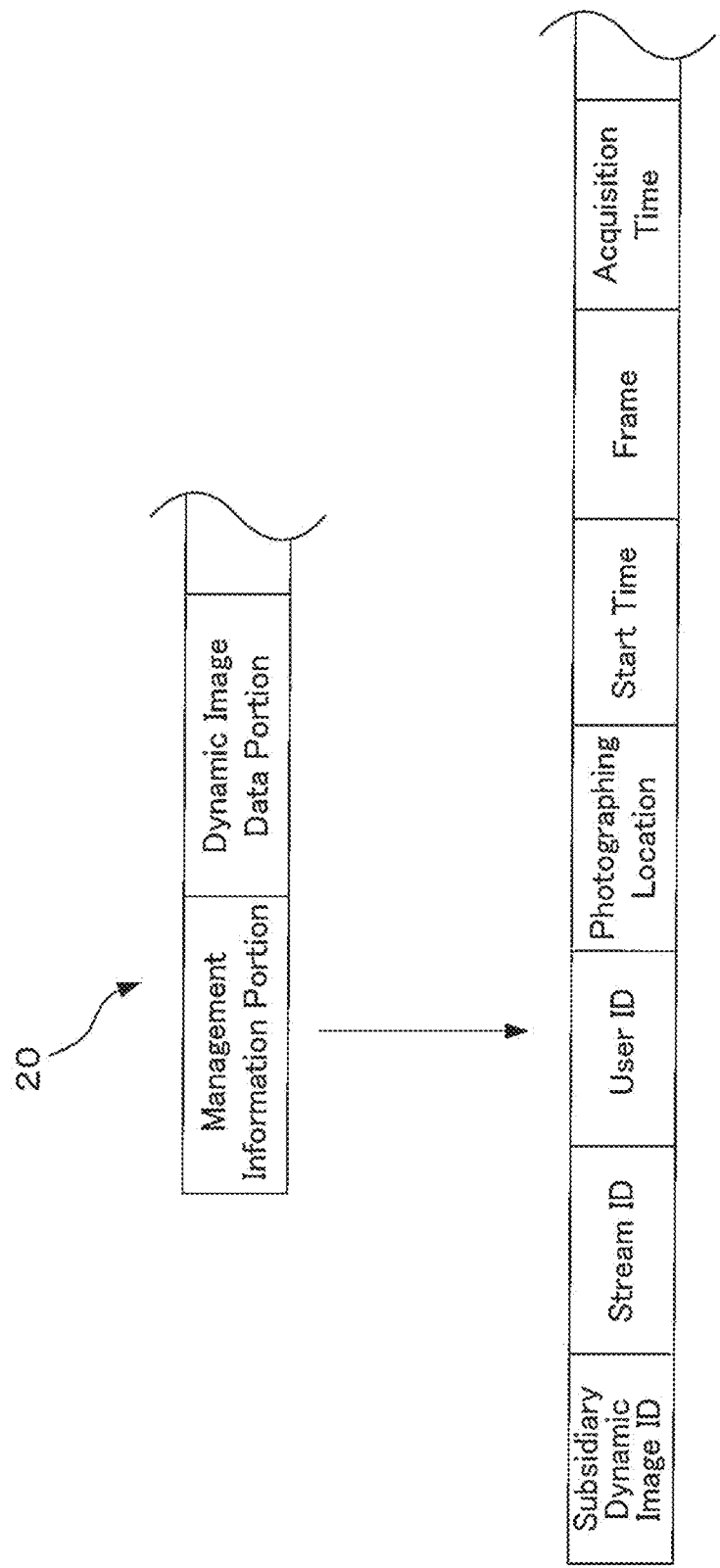
FIG. 10 is a diagram showing one example of contents of subsidiary dynamic image data.

Further, the subsidiary dynamic image data 20 is data for representing each playing dynamic image M. FIG. 10 is a diagram showing one example of contents of the subsidiary dynamic image data 20. As shown in FIG. 10, the subsidiary dynamic image data 20 includes a management information portion and a dynamic image data portion, as with the main dynamic image data 19. The dynamic image data portion is dynamic image data for representing each playing dynamic image M. That is, as with the main dynamic image data 19, the dynamic image data of each playing dynamic image M is managed in association with the management information portion by the subsidiary dynamic image data 20.

The management information portion is a part where management information for managing each playing dynamic image M is recorded. The management information portion includes, for example, information of: the subsidiary dynamic image ID; the stream ID; the user ID; the photographing location; the start time; the frame; and the acquisition time.

The subsidiary dynamic image ID is information for specifying each playing dynamic image M as mentioned above. Accordingly, as the subsidiary dynamic image ID, an ID unique for each playing dynamic image M is used. For example, the subsidiary dynamic image ID is used for discriminating between each playing dynamic image M and each gaming dynamic image G, as with the main dynamic image ID mentioned above. Accordingly, as one example of the subsidiary dynamic image ID, a combination of discriminative information for discriminating between each playing dynamic image M and each gaming dynamic image G and the stream ID, may be used. In this case, only such discriminative information may be recorded in the management information portion, or the recording of the stream ID, mentioned later, may be omitted. Or, in a case each playing dynamic image M is specified by the photographing location and the start time, these kinds of information could function as the subsidiary dynamic image ID. That is, in this case, the subsidiary dynamic image ID may be omitted. Further, in a case that there is information for specifying each portable phone 5b, such information may be used as the subsidiary dynamic image ID.

The stream ID and the user ID were mentioned above. As the information of the user ID, for example, information of the user ID of the photographer may be recorded. Further, though the subject (each playing dynamic image M is the subject) is different, the information of each of the start time (which functions as the photographing time), the frame, and the acquisition time is also similar to the corresponding information for the main dynamic image data 19. The photographing location is information indicating the photographing location of each playing dynamic image M. As the information of the photographing location, for example, positional information obtained by the GPS function of each portable phone 5b may be used. As one example, the management information portion is configured as collected records, each record having the mentioned kinds of information so as to be associated with each other.

Figure 11:
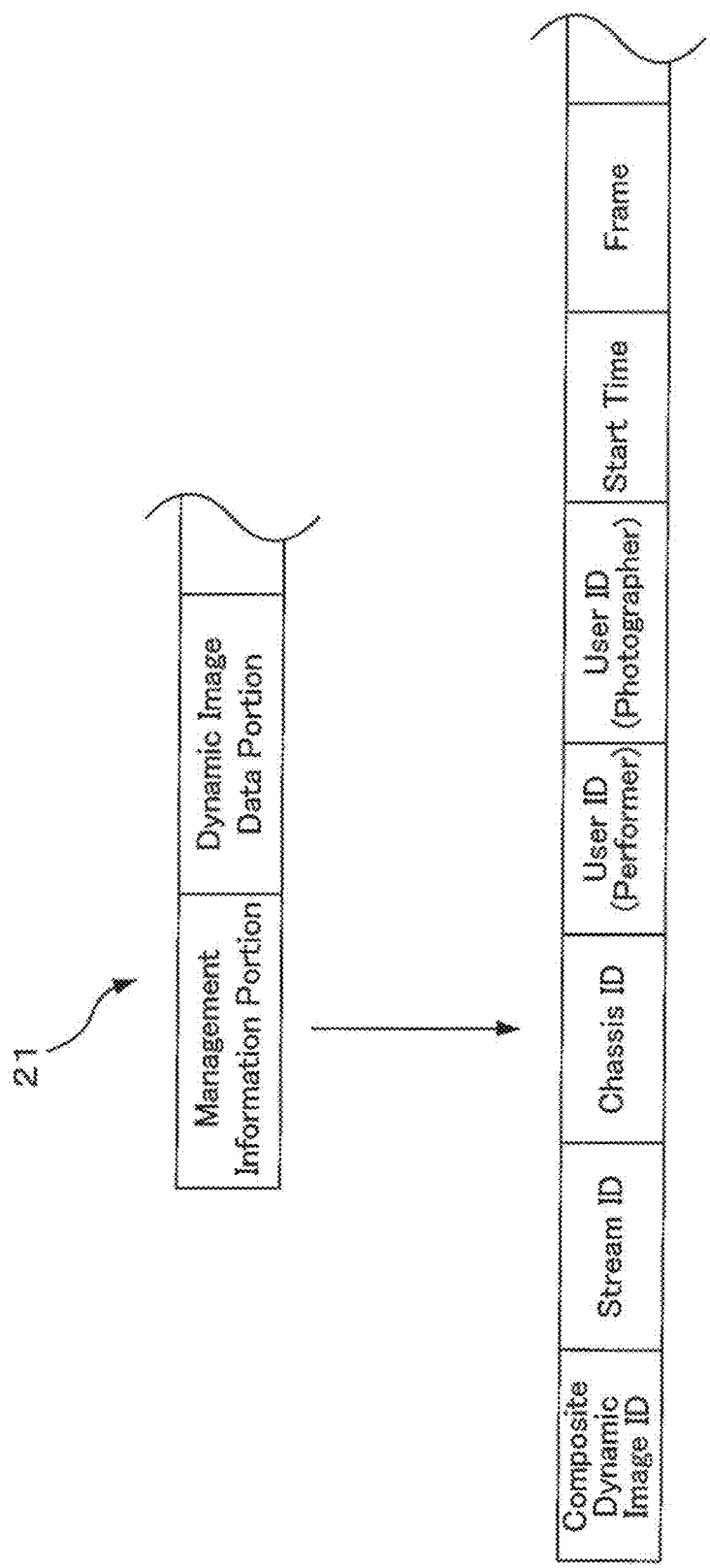
FIG. 11 is a diagram showing one example of contents of composite dynamic image data.

The composite dynamic image data 21 is data for representing each composite dynamic image CM. FIG. 11 is a diagram showing one example of contents of the composite dynamic image data 21. As shown in FIG. 11, the composite dynamic image data 21 includes a management information portion and a dynamic image data portion, as with the main dynamic image data 19 or the subsidiary dynamic image data 20. The dynamic image data portion is dynamic image data for representing each composite dynamic image CM. That is, as with the main dynamic image data 19 or the like, the dynamic image data of each composite dynamic image CM is managed in association with the management information portion by the composite dynamic image data 21.

The management information portion is a part where management information for managing each composite dynamic image CM is recorded. The management information portion includes, for example, information of: a composite dynamic image ID; the stream ID; the user IDs (for a performer P and for a photographer); the start time; and the frame.

The composite dynamic image ID is information for identifying each composite dynamic image CM. Accordingly, as the composite dynamic image ID, an ID unique for each composite dynamic image CM is used. As the composite dynamic image ID, for example, a combination of the main dynamic image ID and the like may be used. Though the subject (each composite dynamic image CM is the subject) is different, the information of each of the stream ID, the chassis ID, the user IDs, the start time, and the frame is also similar to the corresponding information for the main dynamic image data 19 or the like.

Next, main dynamic image data generation processing, subsidiary dynamic image data generation processing, and composite dynamic image generation processing will be described. The main dynamic image data generation processing is processing for generating the main dynamic image data 19. Similarly, the subsidiary dynamic image data generation processing is processing for generating the subsidiary dynamic image data 20. And, the composite dynamic image generation processing is processing for generating the composite dynamic image data.

Figure 12:
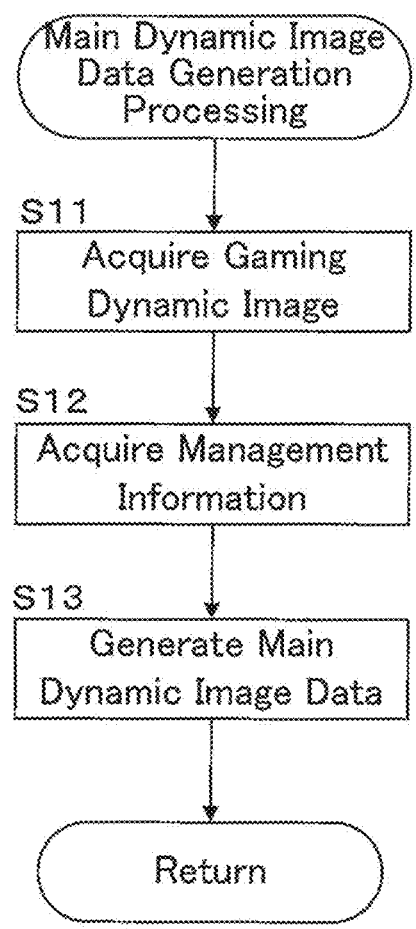
FIG. 12 is one example of a flow chart of a routine for main dynamic image data generating processing.
Figure 13:
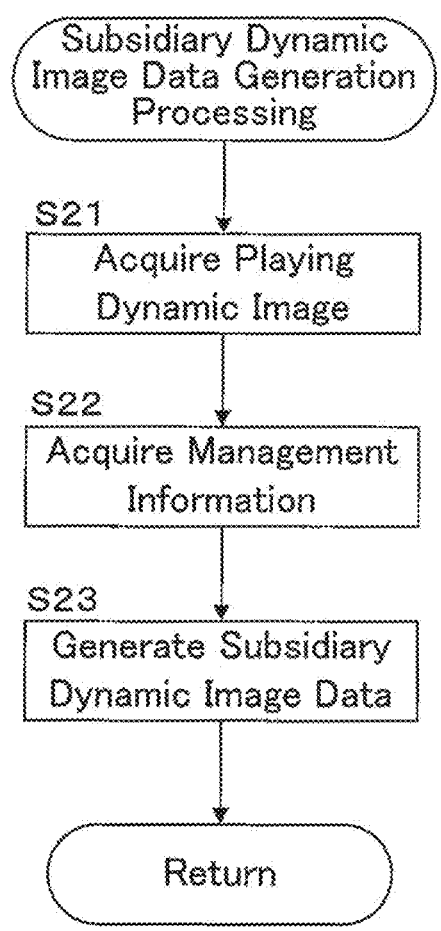
FIG. 13 is one example of a flow chart of a routine for subsidiary dynamic image data generating processing.
Figure 14:
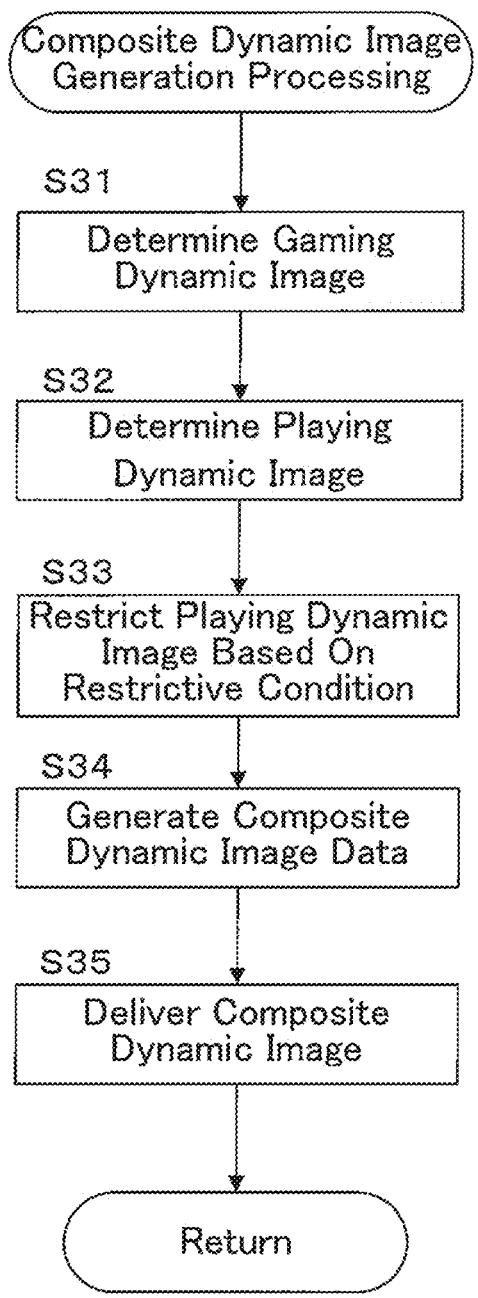
FIG. 14 is one example of a flow chart of a routine for composite dynamic image generating processing.

For example, the main dynamic image data generation processing, the subsidiary dynamic image data generation processing, and the composite dynamic image generation processing are realized by the control unit 10 in the center server 2 through the routines shown in FIG. 12, FIG. 13 and FIG. 14 respectively. More specifically, the routines in FIGS. 12 to 14 are executed through the Web service managing portion 17 of the control unit 10. The control unit 30 of each game machine GM and the control unit 10 of the center server 2 execute, in addition to the above mentioned processing, various kinds of well-known processing independently of each other, or cooperatively with each other. The same applies to the control unit 40 of the user terminal 5. However, the details of them are omitted.

FIG. 12 is a diagram showing one example of a flowchart of the main-dynamic-image-data generation processing routine for realizing the main dynamic image data generation processing. The routine of FIG. 12 is executed, as one example, each time when the game is played at each game machine GM, that is, each time when the game opportunity is provided. For example, the information of providing the game opportunity may be transmitted from each game machine GM, each time when the game opportunity is provided.

When the routine of FIG. 12 is started, first, the Web served managing portion 17 acquires each gaming dynamic image G at step S11. More specifically, the Web service managing portion 17 acquires data for representing each gaming dynamic image G, that is, dynamic image data corresponding to the dynamic image data portion of each gaming dynamic image G. As one example, this acquisition, that is, the processing of step S11 may be executed for each frame dynamic image of each gaming dynamic image G. The following steps (processing) in the routine of FIG. 12 are also executed in the same manner.

At subsequent step S12, the Web service managing portion 17 acquires the management information. More specifically, the Web service managing portion 17 acquires from each game machine GM and the like, each information included in the management information portion with respect to the stream ID, the chassis ID, the user ID (the performer P), and the like, as the management information. In the routine of FIG. 12, for the convenience of the explanation, the processing of step S11 and the processing of step S12 were explained as separate processing from each other. However, these steps may be executed as a single processing. That is, the gaming dynamic image G and the management information thereof may be acquired at the same time as the same processing.

Next, at step S13, the Web service managing portion 17 generates the main dynamic image data 19 based on the acquisition results of the steps S11 and S12. Specifically, the Web service managing portion 17 generates the main dynamic image data 19 (or the record forming the main dynamic image data 19) where the gaming dynamic image G acquired at step S11 (the dynamic image portion) and the management information acquired at step S12 (the management information portion) are recorded so as to be associated with each other. And then, after completing the processing of step S13, the Web service managing portion 17 ends this routine. Thereby, the main dynamic image data 19, for managing each gaming dynamic image G in association with the corresponding management information, is generated.

Similarly, FIG. 13 is a diagram showing one example of a flowchart of the subsidiary-dynamic-image-data generation processing routine for realizing the subsidiary dynamic image data generation processing. As one example, the routine of FIG. 13 is executed each time when photography is started via the application for delivery service. For example, the start of photography via the application for delivery service may be provided from the portable phone 5b each time when the photography is started.

When the routine of FIG. 13 is started, first, the Web service managing portion 17 acquires each playing dynamic image M at step S21, as with the step S11 of the routine of FIG. 12. More specifically, the Web service managing portion 17 acquires data for representing each playing dynamic image M, that is, dynamic image data corresponding to the dynamic image data portion of each playing dynamic image M. As one example, this acquisition, that is, the processing of step S21 may be executed for each frame dynamic image of each playing dynamic image M, as with the step S11 of the routine of FIG. 12. The following steps (processing) in the routine of FIG. 13 are also executed in the same manner.

At subsequent step S22, the Web service managing portion 17 acquires the management information. More specifically, the Web service managing portion 17 acquires from each portable phone 5b and the like, each information included in the management information portion with respect to the stream ID, the user ID (the photographer), the photographing location, the start time, and the acquisition time, and the like, as the management information. As with the steps 11 and 12 of the routine of FIG. 12, the processing of step S21 and the processing of step S22 may be executed as a single processing.

Next, at step S23, the Web service managing portion 17 generates the subsidiary dynamic image data 20 based on the acquisition results of the steps S21 and S22. Specifically, the Web service managing portion 17 generates the subsidiary dynamic image data 20 (or the record forming the subsidiary dynamic image data 20) where the playing dynamic image M acquired at step S21 (the dynamic image portion) and the management information acquired at step S22 (the management information portion) are recorded so as to be associated with each other. And then, after completing the processing of step S23, the Web service managing portion 17 ends this routine. Thereby, the subsidiary dynamic image data 20, for managing each playing dynamic image M in association with the corresponding management information, is generated.

FIG. 14 is a diagram showing one example of a flowchart of the composite-dynamic-image generation processing routine for realizing the composite dynamic image generation processing. The routine of FIG. 14 is executed, as one example, each time when the dynamic-image delivery service is required from each personal computer 5a. As one example, this requirement may include a designation of gaming dynamic image G (for example, information of the stream ID corresponding to the gaming dynamic image G designated). Besides that, this requirement may include various kinds of information for designating dynamic image as a target to be delivered, such as a designation of playing dynamic image M, a designation of the stream ID, or a designation of the user ID.

When the routine of FIG. 14 is started, first at step 31, the Web service managing portion 17 determines the gaming dynamic image G which is a target of the dynamic-image delivery service. For example, at step S31, the Web service managing portion 17 determines the gaming dynamic image G which is the target of the dynamic-image delivery service based on the designation of gaming dynamic image G included in the requirement of the dynamic-image delivery service. More specifically, for example, the Web service managing portion 17 determines the gaming dynamic image G as the target, based on the stream ID (one example of information for designating each gaming dynamic image G) included in the requirement of the dynamic-image delivery service. As one example, this determination, that is, the processing of step S31 may be executed for each frame dynamic image of each gaming dynamic image G. Similarly, the following steps (processing) in the routine of FIG. 14 may be also executed for each frame dynamic image of each playing dynamic image M or of each composite dynamic image CM.

At subsequent step S32, the Web service managing portion 17 determines each playing dynamic image M corresponding to the gaming dynamic image G specified at the step S31. For example, this determination is executed by using the stream ID as a reference. Specifically, at step S32, as one example, the Web service managing portion 17 determines playing dynamic images M (corresponding to the particular playing dynamic image group MM1), each having the stream ID shared with the gaming dynamic image G determined at step S31.

Next, at step S33, the Web service managing portion 17 restricts each playing dynamic image M determined at the step S32, based on the restrictive condition. Specifically, the Web service managing portion 17 restricts to use each playing dynamic image M satisfying the restrictive condition so that such playing dynamic image M is not used as the target to be synthesized. That is, the Web service managing portion 17 sifts the playing dynamic images M determined at step S32 (that is, specifies the playing dynamic image group MM2 for targets to be synthesized in the example of FIG. 7), so that each playing dynamic image M satisfying the restrictive condition is not included.

At subsequent step S34, the Web service managing portion 17 generates the composite dynamic image data 21, based on the determination result of the step S31 and the restriction result of the step S33. As one example, this generation is executed as follows. First, the Web service managing portion 17 synthesizes the gaming dynamic image G determined at the step S31 and the playing dynamic images M selected (specified) at the step S33. Specifically, the Web service managing portion 17 generates data for representing the composite dynamic image CM where the above images G and M are synthesized, that is, dynamic data corresponding to the dynamic image data portion of each composite dynamic image CM. This generation is executed by, for example, using the dynamic image data portions of the main dynamic image data 19 and the subsidiary dynamic image data 20. Subsequently, the Web service managing portion 17 acquires the management information, that is, the information of the management information portion corresponding to each of the dynamic image data portions from the main dynamic image data 19 or the subsidiary dynamic image data 20. And then, the Web service managing portion 17 generates the composite dynamic image data 21 (or, the record forming the composite dynamic image data 21 for the composite dynamic image to be delivered) where the synthesized composite dynamic image CM (the dynamic image data portion) and the acquired management information (the management information portion) are recorded so as to be associated with each other. As one example, at step S34, the Web service managing portion 17 generates the composite dynamic image data 21 in this way.

Next, at step S35, the Web service managing portion 17 delivers the composite dynamic image CM based on the composite dynamic image data 21 generated at the step S34, so that the image CM is displayed in the dynamic image region 61 of the delivery screen 60. And then, after completing the processing of step S35, the Web service managing portion 17 ends this routine. Thereby, the composite dynamic image CM is generated based on each gaming dynamic image G and each playing dynamic image M corresponding to each of the gaming dynamic images G. And, the composite dynamic image data 21, where the dynamic image data of the composite dynamic image CM and the management information for the composite dynamic image CM are associated with each other, is generated. Further, based on the composite dynamic image data 21, the composite dynamic image CM is delivered to each personal computer 5a in response to a requirement of the dynamic-image delivery service. That is, the dynamic-image delivery service where a target to be delivered is each composite dynamic image CM is provided.

As mentioned above, according to this embodiment, each gaming dynamic image G and each playing dynamic image M are associated with each other via the stream ID. Each playing dynamic image M is a dynamic image where a performer P playing a game has been photographed. That is, a gaming dynamic image G and a dynamic image where a performer P playing a game with the gaming dynamic image G has been photographed are associated with each other via the stream ID. Each gaming dynamic image G and each playing dynamic image M which should be synthesized with each other are determined by using the stream ID as a reference, and the delivery screen 60 including the composite dynamic image CM, where the images G and M are synthesized so as to be displayed is delivered. That is, via the composite dynamic image CM, it is possible to display on the delivery screen 60, different kinds of dynamic image such as the gaming dynamic image G and the playing dynamic image M.

Further, in the composite dynamic image CM, each playing dynamic image M is synthesized as the wiping dynamic image. Thereby, it is possible to display only in the display region (the dynamic image region 61) for a gaming dynamic image M, both of the gaming dynamic image G and each playing dynamic image M. As a result, it is possible to concentrate the range where users should watch into the inside of the display region for the gaming dynamic image G. Thereby, it is possible to provide the gaming dynamic image G and the playing dynamic image M with improved visualization thereof.

In the music game of this embodiment, the dancing motions (or operations) of a performer P playing the game are important. Accordingly, the needs for such dancing motions of the performer P are high. Especially, it would be effective that the dancing motions are provided together with the change of the game screen 50 during game-play, that is, the contents of the gaming dynamic image G. According to the dynamic-image delivery service, via each composite dynamic image CM, it is possible to provide such important information with improved visualization for each user. Thereby, it is possible to promote use of a music game. Further, in the consideration of the above needs, if the gaming dynamic image G and each playing dynamic image M are reproduced in a synchronous manner, the usefulness would be made higher. In each composite dynamic image CM, the gaming dynamic image G and each playing dynamic image M are synthesized so as to be synchronized with each other. Accordingly, it is also possible to improve the usefulness of each composite dynamic image CM.

Further, by the restrictive condition, it is restricted to use each playing dynamic image M which is not preferable for the target to be synthesized. Thereby, it is possible to generate more appropriate, or more preferable, composite dynamic image M. Thereby, it is possible to improve interest of games.

In the above embodiment, the control unit 10 of the center server 2 functions as the dynamic image acquiring device of the present invention by executing the routine of FIG. 13 through the Web service managing portion 17. The control unit 10 of the center server 2 further functions as a dynamic image determining device, a dynamic image providing device, and a composite dynamic image generating device by executing the routine of FIG. 14 through the Web service managing portion 17. On the other hand, the storage unit 11 of the center server 2 functions as a dynamic image storing device by storing the main dynamic image data 19.

The present invention is not limited to the above mentioned embodiment, and can be executed in various embodiments as appropriate. For example, in the above embodiment, the composite dynamic image data 21 is generated in response to the requirement for the dynamic-image delivery service, through the routine of FIG. 14. However, the present invention is not limited to such an embodiment. For example, the composite dynamic image data 21 may be generated in advance. In this case, in the dynamic-image delivery service, a list of composite dynamic images CM (for example, a part of each composite dynamic image CM is displayed like a thumbnail image.) may be provided to each user. The composite dynamic image CM selected by a user from the list may be delivered to the user. Accordingly, for example, the routine of FIG. 14 may be divided into a part for generating the composite dynamic image CM and a part for delivering the composite dynamic image CM.

In the above embodiment, a dynamic image where a performer P playing a game has been photographed is employed as the playing dynamic image M, and the gaming dynamic image G is employed as a target to be synthesized with that. However, the present invention is not limited to such an embodiment. Various kinds of dynamic image may be employed as the dynamic image of the target to be synthesized (hereinafter, for convenience in order to discriminate this dynamic image from a dynamic image photographed by each portable phone 5*b*, sometimes referred to as the main dynamic image). For example, as the main dynamic image, various kinds of dynamic images, such as a musical-dynamic image (including dynamic images for karaoke and the like) and a movie (including a TV program) may be employed. As one example, the above dynamic images may be stored in the center server 2 in advance. Similarly, as the playing dynamic image M, for example, a dynamic image of a user singing karaoke, or a dynamic image of a user watching a movie or the like, may be employed. In this case, as the stream ID, for example, a music tune ID for identifying each music tune, or an ID or the like for identifying each movie or the like, may be employed.

Further, a dynamic image photographed by each portable phone 5*b* (hereinafter, for convenience, sometimes referred to as the subsidiary dynamic image) is not limited to the playing dynamic image M. As the subsidiary dynamic image, various kinds of dynamic image photographed by each portable phone 5*b* may be employed. Further, the present invention is not limited to the embodiment where the main dynamic image and the subsidiary dynamic image are synthesized with each other. For example, the subsidiary dynamic images may be synthesized with each other by using the stream ID as a reference. That is, the subsidiary dynamic image (a photographed dynamic image) may function as the main dynamic image. In this way, various kinds of dynamic images can be synthesized with each other, as the subsidiary dynamic image and the main dynamic image. Accordingly, depending on the kind of each dynamic image, the main dynamic image and the subsidiary dynamic image are not always required to be synthesized so as to be synchronized with each other. That is, the present invention is also not limited to the embodiment that the subsidiary dynamic image and the main dynamic image are displayed in synchronization.

Further, in the above embodiment, each composite dynamic image CM is generated at the center server 2 through the routine of FIG. 4. In this case, it is possible to reduce processing load of each personal computer 5*a*. However, the present invention is not limited to such an embodiment. For example, each composite dynamic image CM may be generated at each personal computer 5*a*. In this case, it is possible to reduce processing load of the center server 2. Further, in this case, the gaming dynamic image G and the playing dynamic image M which are the targets to be synthesized may be provided to each personal computer 5*a* by the center server 2 so that the composite dynamic image CM is generated at each personal computer 5*a*.

Figure 15:
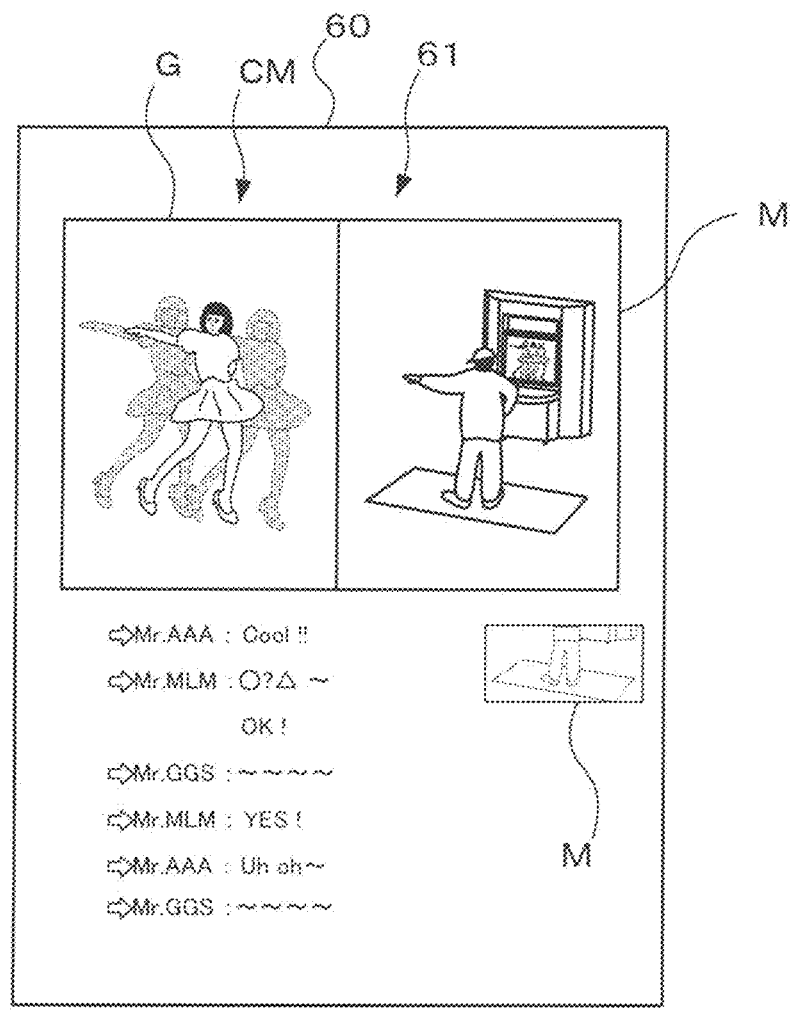
FIG. 15 is a diagram schematically showing one example of the other delivery screen.

In the above embodiment, each playing dynamic image M is synthesized with the corresponding gaming dynamic image G as a wiping dynamic image. However, the present invention is not limited to such an embodiment. Each playing dynamic image M may be synthesized with the gaming dynamic image G in various embodiments. FIG. 15 is a diagram schematically showing another example of the delivery screen 60. As shown in FIG. 15, for example, each gaming dynamic image G and each playing dynamic image M may be synthesized so that the dynamic image region 61 is shared by them. That is, each playing dynamic image M may be displayed in a region of the dynamic image region 61, other than a region where the gaming dynamic image G is displayed. Each playing dynamic image M may be arranged, not as the composite dynamic image CM, but as a different dynamic image in a different region (e.g. the chat region 62 or the like) from a region for the composite dynamic image CM or the gaming dynamic image G. That is, each gaming dynamic image G and each playing dynamic image M may be displayed independently of each other in the delivery screen 60, without their synthesis. The number of playing dynamic images M displayed in the delivery screen 60 (or synthesized for each composite dynamic image) may be arbitrary.

In the above embodiment, based on the restrictive condition, it is restricted to use a part of playing dynamic images M when the corresponding composite dynamic image CM is generated. However, the present invention is not limited to such an embodiment. For example, the restriction based on the restrictive condition mentioned above may be executed at the moment when each playing dynamic image M is acquired. That is, it may be restricted to acquire a part of playing dynamic images M, based on the restrictive condition. Alternatively, the restriction based on such a restrictive condition may be omitted. That is, all playing dynamic images M each having the same stream ID for each gaming dynamic image C may be synthesized as the targets to be synthesized unconditionally.

In the above embodiment, as one example, the stream ID is provided to each portable phone 5*b* via the two-dimensional code image 81. However, the present invention is not limited to such an embodiment. For example, the stream ID may be provided from each game machine GM to each portable phone 5*b* through any kind of communication, such as infrared communication. Or each game machine GM may just display information of the stream ID. And, the stream ID may be inputted to each portable phone 5*b* by each user who references the stream ID. Further, the stream ID may be provided from the center server 2, for example, through the Web service. More specifically, for example, the stream ID may be provided through an announcement screen of the stream ID as one of the game information service. Such an announcement screen may be displayed at, for example, each personal computer 5a. And, for example, the stream ID also may be inputted to each portable phone 5b by each user, as with the case the stream ID is displayed at each game machine GM. Or, for example, to each portable phone 5b, based on its positional information, candidates of game machines GM existing in a vicinity of the portable phone 5b or of the gaming dynamic images G each corresponding to each of those game machines GM may be provided from the center server 2. And, the stream ID may be provided from the center server 2 through the selection from the candidates.

In a case that the candidates of the gaming dynamic images G are provided, the center server 2 may specify the stream ID according to the selection. In this case, it is not necessary to provide information of the stream ID itself to each portable phone 5b. Accordingly, the present invention is not limited to the embodiment that each portable phone 5b provides the stream ID as information for specifying the main dynamic image. Various kinds of specific information capable of specifying the main dynamic image may be provided from each portable phone 5b. For example, each portable phone 5b may provide, as the specific information, positional information indicating its location based on the GPS function. In this case, by using that positional information and the facility positional information as a reference, the store 4 and the game machine GM can be specified. As a result, the gaming dynamic image G corresponding to the specified game machine GM can be also specified. In this way, as the specific information, various kinds of information such as the information designating the main dynamic image or the positional information, may be employed.

Further, the stream ID is not limited to the one which the center server 2 gives to each game machine GM. For example, when information unique for each game machine GM, such as the chassis ID, is used as the stream ID, the stream ID is not necessary to be given to each game machine GM by the center server 2. In this case, the stream ID may be provided to each portable phone 5b, for example, through the Web service as mentioned above, or may be provided by using a medium other than the center server 2, such as a sales promotion object e.g. a poster, a POP advertising (Point of Purchase advertising), or the like. In these cases, for example, the stream ID may be stored in each game machine GM in advance.

In the above each embodiment, the game provided by each game machine GM is not limited to the music game. Each game machine GM may provide various games such as an action game, a role-playing game, a simulation game, and a shooting game.

Further, the photography-use terminal is not limited to the portable phone 5b. As long as having the photographing function and being capable of a network connection, various devices, e.g. the personal computer 5a or a just camera, may be employed as the photography-use terminal. The same applies to the display-use terminal. As long as being capable of a network connection and displaying a dynamic image, various devices may be employed as the display-use terminal. Further, a single user terminal 5 may function as both of the display-use terminal and the photography-use terminal.

In the above embodiments, each game machine GM provides the game in exchange of consumption of predetermined counter value. However, each game machine GM is not limited to such an embodiment. For example, each game machine GM may provide a game opportunity allowing a user to play each game at no charge. That is, each game opportunity may be provided with no relation to the consumption of counter value. For example, each game opportunity may be provided if a predetermined start condition having no relation with consumption of counter value is satisfied. Further, the predetermined start condition may be satisfied, for example, when a predetermined start operation is performed, or predetermined start information is provided. Furthermore, the user ID may be included in the predetermined start information. Accordingly, for example, each game opportunity may be provided, with no relation to the consumption of counter value, each time when the user ID of a user going to play a game is provided via a user card or the like, where the user ID is recorded.

Further, each game machine GM is not limited to a game machine for business use. As the game machine GM, any appropriate type of device, for example, a desktop game machine for home use (including a desktop personal computer capable of executing games), a portable game machine (including portable terminals capable of executing games, such as a smart phone, a tablet PC, and a portable personal computer), may be employed. In the above embodiments, the control unit 30 and the storage unit 31 are provided in the game machine GM. However, the game machine of the present invention is not limited to such an embodiment. For example, the control unit 30 and the storage unit 31 may be provided logically on a network by using the cloud computing technology. That is, the game machine GM may be configured as a terminal device which provides display of the processing result of the control unit 30 through the network 3. Further, with respect to the game system of the present invention, the center server 2 may be omitted, and the game system may be realized by a single game machine.

Hereinafter, one example of the present invention obtained from the above contents will be explained.

A first server apparatus as one aspect of the present invention is a server apparatus which is connected with, via a network, at least one display-use terminal each being programmed to display a predetermined screen and at least one photography-use terminal each being programmed to photograph a terminal dynamic image, the server apparatus comprising: a dynamic image storage device which stores a plurality of dynamic images different from each other in association with dynamic image identification information for identifying each of the plurality of the dynamic images; and a computer; the computer being programmed to function as: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; and a dynamic image providing device which is configured to provide the terminal dynamic image and the target dynamic image to the display-use terminal, based on a determination result of the dynamic image determining device.

According to the present invention, the terminal dynamic image is associated with the dynamic image identification information via the specific information. The target dynamic image corresponding to the terminal dynamic image is determined by using the dynamic image identification information as a reference, and a composite screen including both of those is displayed by the display-use terminal as the predetermined screen. As the terminal dynamic image, various dynamic images can be photographed through the photography-use terminal. That is, the terminal dynamic image is not limited to a specific kind or the like. The determination of the dynamic image determining device includes, for example, a case that the terminal dynamic image corresponding to the dynamic image identification information of a specific target dynamic image is determined in a case that more than one terminal dynamic images exist.

The terminal dynamic image and the target dynamic image may be displayed on a composite screen in various embodiments. For example, in one embodiment of the server apparatus according to the above aspect of the present invention, both of the terminal dynamic image and the target dynamic image may be displayed on the composite screen, through the composite dynamic image where the terminal dynamic image and the target dynamic image are synthesized. Further, in this embodiment, a display region for the terminal dynamic image may be provided within a display region for the target dynamic image, and both of the terminal dynamic image and the target dynamic image may be displayed in the display region for the target dynamic image.

In an embodiment that a composite dynamic image of the present invention is generated, the server apparatus may further comprise a composite dynamic image generating device which is configured to generate a composite dynamic image based on a determination result of the dynamic image determining device, and the dynamic image providing device may be configured to provide the composite dynamic image as the terminal dynamic image and the target dynamic image, so that both of the terminal dynamic image and the target dynamic image are displayed on the composite screen, through the composite dynamic image. In this case, the composite dynamic image which has been already generated is provided to the display-use terminal. Accordingly, it is not necessary for the display-use terminal to generate the composite dynamic image.

A second server apparatus as a further aspect of the present invention is a server apparatus which is connected with, via a network, at least one display-use terminal each being programmed to display a predetermined screen and at least one photography-use terminal each being programmed to photograph a terminal dynamic image, the server apparatus comprising: a dynamic image storage device which stores a plurality of dynamic images different from each other in association with dynamic image identification information for identifying each of the plurality of the dynamic images; and a computer; the computer being programmed to function as: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; a composite dynamic image generating device which is configured to generate a composite dynamic image where the terminal dynamic image and the target dynamic image are synthesized, based on a determination result of the dynamic image determining device; and a dynamic image providing device which is configured to provide the composite dynamic image so that the composite dynamic image is displayed in the predetermined screen, based on a generation result of the composite dynamic image generating device.

The number of terminal dynamic images may be arbitrary. For example, the dynamic image acquiring device may be configured to acquire a plurality of terminal dynamic images; and the composite dynamic image generating device may be configured to restrict based on a restrictive condition, use of at least a part of the plurality of terminal dynamic images, so that each terminal dynamic image satisfying the restrictive condition is not used for the composite dynamic image. Or, the dynamic image acquiring device may be configured to restrict based on a restrictive condition, acquisition of at least a part of the plurality of terminal dynamic images, so that each terminal dynamic image satisfying the restrictive condition is not acquired.

As the restrictive condition, various kinds of conditions may be employed. For example, the dynamic image acquiring device may be configured to further acquire from the photography-use terminal, information indicating at least any one of photographing time and acquisition time of each terminal dynamic image, the photographing time or the acquisition time may be employed as a criterion for the restrictive condition; and the restrictive condition may be satisfied in a case that the photographing time or the acquisition time of each terminal dynamic image does not belong to a predetermined range. Further, the dynamic image acquiring device may be configured to further acquire information of a photographing location of each terminal dynamic image from the photography-use terminal, and the photographing location may be employed as a criterion for the restrictive condition; and the restrictive condition may be satisfied in a case that the photographing location of each terminal dynamic image does not belong to a predetermined range of location. Or, the dynamic image acquiring device may be configured to further acquire from the photography-use terminal, user identification information for identifying a user of each photography-use terminal in association with each terminal dynamic image, the user identification information may be employed as a criterion for the restrictive condition, and the restrictive condition may be satisfied in a case that the user identification information is not included or included in particular user data where the user identification information of each of a part of users is recorded.

The arbitrary number of terminal dynamic images may be displayed in the composite screen. For example, in the embodiment that more than two terminal dynamic images of the present invention are photographed, the dynamic image providing device may be configured to provide the plurality of terminal dynamic images and the target dynamic image so that the plurality of terminal dynamic images and the target dynamic image are displayed on the composite screen.

In one embodiment of the server apparatus according to the above aspect of the present invention, each of the target dynamic image and the terminal dynamic image may be divided into a plurality of frame dynamic images for each predetermined period in time series, and each of the plurality of frame dynamic images of the target dynamic image and each of the plurality of frame dynamic images of the terminal dynamic image may be displayed in a synchronized manner on the composite screen, so that passage of time with respect to the terminal dynamic image is synchronized with passage of time with respect to the target dynamic image. There are the target dynamic images and the terminal dynamic images such that their convenience improves because of the synchronization of them.

Various dynamic images may be stored as the plurality of dynamic images in the dynamic image storage device. For example, in one embodiment of the server apparatus according to the above aspect of the present invention, the server apparatus may be further connected with at least one game machine each providing a plurality of game opportunities each being played through a game screen, wherein a plurality of gaming dynamic images each showing change of the game screen which changes in time series with respect to each of the game opportunities may be provided from the at least one game machine to the dynamic image storage device so that the plurality of gaming dynamic images are stored as the plurality of dynamic images.

In one embodiment of the server apparatus according to the above aspect of the present invention, a playing dynamic image where a user during game-play in each game opportunity has been photographed may be used as the terminal dynamic image. In this case, the game screen and a user state corresponding to the game screen are provided through the composite screen. That is, both of the game screen and the user state are provided through the composite screen. Depending on the kind of the game, information of game-play actions (for example, operations, motions, and the like) of a user playing the game is sometimes important. For example, in a music game, information of concrete operations (or motions) corresponding to a task shown in a game screen is highly required. That is, in such a kind of game, the information of both of the game screen and the user state has a high degree of importance.

Various kinds of information may be used as the specific information. For example, in one embodiment of the server apparatus according to the above aspect of the present invention, the server apparatus may be connected with, as the at least one game machine, a plurality of game machines installed to a plurality of facilities, wherein facility location information indicating a location of each of the plurality of facilities where each game machine is installed may be used as the dynamic image identification information, information of a photographing location indicating a location where the terminal dynamic image has been photographed may be used as the specific information, and at least a part of the gaming dynamic images provided by the game machine of the facility corresponding to the photographing location may be specified as the target dynamic image based on the facility location information and the information of the photographing location. Or, the game machine may provide the dynamic image identification information, and the dynamic image identification information provided by the game machine may be used as the specific information. And, in this embodiment, the game machine, by displaying a code formed so that the dynamic image identification information is included, may provide the dynamic image identification information to the photography-use terminal via the code.

Similarly, various kinds of information may be used as the dynamic image identification information. For example, in one embodiment according to the above aspect of the present invention, the server apparatus may be connected with a plurality of game machines as the at least one game machine, and chassis identification information for identifying each of the plurality of game machines from each other mat be used as the dynamic image identification information.

A control method as a further aspect of the present invention is a control method for making a computer of a server apparatus, the server apparatus being connected with, via a network, at least one display-use terminal each being programmed to display a predetermined screen and at least one photography-use terminal each being programmed to photograph a terminal dynamic image, and comprising a dynamic image storage device which stores a plurality of dynamic images different from each other in association with dynamic image identification information for identifying each of the plurality of the dynamic images, the method for making the computer execute the following steps: a dynamic image acquiring step of acquiring from the photography-use terminal, the terminal dynamic image, and specific information for specifying the dynamic image identification information which is associated with the terminal dynamic image; a dynamic image determining step of determining a dynamic image corresponding to the dynamic image identification information specified by the specific information, as a target dynamic image within the plurality of dynamic images, based on an acquisition result of the dynamic image acquiring step; and a dynamic image providing step of providing the terminal dynamic image and the target dynamic image to the display-use terminal, based on a determination result of the dynamic image determining step.

A non-transitory computer readable storage medium as a further aspect of the present invention is a non-transitory computer readable storage medium storing a computer program for a server apparatus, the server apparatus being connected with, via a network, at least one display-use terminal each being programmed to display a predetermined screen and at least one photography-use terminal each being programmed to photograph a terminal dynamic image, and comprising a computer, and a dynamic image storage device which stores a plurality of dynamic images different from each other in association with dynamic image identification information for identifying each of the plurality of the dynamic images, the computer program making the computer execute: a dynamic image acquiring device which is configured to acquire from the photography-use terminal, the terminal dynamic image, and specific information for specifying the dynamic image identification information which is associated with the terminal dynamic image; a dynamic image determining device which is configured to determine a dynamic image corresponding to the dynamic image identification information specified by the specific information, as a target dynamic image within the plurality of dynamic images, based on an acquisition result of the dynamic image acquiring device; a dynamic image providing device which is configured to provide the terminal dynamic image and the target dynamic image to the display-use terminal, based on a generation result of the composite dynamic image generating device. Thereby, the server apparatus of the present invention according to the above aspect is realized.

A first dynamic-image delivery system as a further aspect of the present invention is a dynamic-image delivery system including at least one display-use terminal each being programmed to display a predetermined screen, at least one photography-use terminal each being programmed to photograph a terminal dynamic image, and a server apparatus, wherein the at least one display-use terminal and the at least one photography-use terminal, and the server apparatus are connected with each other via a network, the dynamic-image delivery system comprising: a dynamic image storage device which stores a plurality of dynamic images different from each other in association with dynamic image identification information for identifying each of the plurality of the dynamic images; a dynamic image acquiring device programmed to acquire from the photography-use terminal, the terminal dynamic image, and specific information for specifying the dynamic image identification information which is associated with the terminal dynamic image; a dynamic image determining device programmed to determine a dynamic image corresponding to the dynamic image identification information specified by the specific information, as a target dynamic image within the plurality of dynamic images, based on an acquisition result of the dynamic image acquiring device; and a dynamic image providing device programmed to provide the terminal dynamic image and the target dynamic image to the display-use terminal, based on a determination result of the dynamic image determining device.

A second dynamic-image delivery system as a further aspect of the present invention is a dynamic-image delivery system in which at least one display-use terminal each being programmed to display a predetermined screen, at least one photography-use terminal each being programmed to photograph a terminal dynamic image, and a server apparatus are connected with each other via a network, the dynamic-image delivery system comprising: a dynamic image storage device which stores a plurality of dynamic images different from each other in association with dynamic image identification information for identifying each of the plurality of the dynamic images; a dynamic image acquiring device programmed to acquire from the photography-use terminal, the terminal dynamic image, and specific information for specifying the dynamic image identification information which is associated with the terminal dynamic image; a dynamic image determining device programmed to determine a dynamic image corresponding to the dynamic image identification information specified by the specific information, as a target dynamic image within the plurality of dynamic images, based on an acquisition result of the dynamic image acquiring device; a composite dynamic image generating device programmed to generate a composite dynamic image where the terminal dynamic image and the target dynamic image are synthesized, based on a determination result of the dynamic image determining device; and a dynamic image providing device programmed to provide the composite dynamic image so that the composite dynamic image is displayed in the predetermined screen, based on a generation result of the composite dynamic image generating device.

What is claimed is:

1. A server apparatus which is connected with, via a network, a plurality of display-use terminals each being programmed to display a predetermined screen, a plurality of game machines each providing a plurality of game opportunities each being played through a game screen, and a plurality of photography-use terminals each being programmed to photograph a terminal dynamic image including a playing dynamic image where a user during game-play in each game opportunity has been photographed, the server apparatus comprising:
   a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images; and
   a computer;
   the computer being programmed to function as:
      a dynamic image acquiring device which is configured to acquire from the photography-use terminal, the terminal dynamic image, and specific information for specifying the dynamic image identification information which is associated with the terminal dynamic image;
      a dynamic image determining device which is configured to determine a dynamic image corresponding to the dynamic image identification information specified by the specific information, as a target dynamic image within the plurality of dynamic images, based on an acquisition result of the dynamic image acquiring device;
      a dynamic image providing device which is configured to provide the terminal dynamic image and the target dynamic image to the display-use terminal, based on a determination result of the dynamic image determining device; and
      a composite dynamic image generating device which is configured to generate a composite dynamic image where the terminal dynamic image and the target dynamic image are synthesized, based on a determination result of the dynamic image determining device;
      wherein the dynamic image providing device is configured to provide the composite dynamic image so that the composite dynamic image is displayed in the predetermined screen, based on a generation result of the composite dynamic image generating device.

2. A server apparatus which is connected with, via a network, at least one display-use terminal each being programmed to display a predetermined screen, at least one game machine each providing a plurality of game opportunities each being played through a game screen, and at least one photography-use terminal each being programmed to photograph a terminal dynamic image including a playing dynamic image where a user during game-play in each game opportunity has been photographed, the server apparatus comprising:
   a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images; and
   a computer;
   the computer being programmed to function as:
      a dynamic image acquiring device which is configured to acquire from the photography-use terminal, the terminal dynamic image, and specific information for specifying the dynamic image identification information which is associated with the terminal dynamic image;
      a dynamic image determining device which is configured to determine a dynamic image corresponding to the dynamic image identification information specified by the specific information, as a target dynamic image within the plurality of dynamic images, based on an acquisition result of the dynamic image acquiring device;
      a composite dynamic image generating device which is configured to generate a composite dynamic image where the terminal dynamic image and the target dynamic image are synthesized, based on a determination result of the dynamic image determining device; and a dynamic image providing device which is configured to:

provide the terminal dynamic image and the target dynamic image to the display-use terminal, based on a determination result of the dynamic image determining device; and provide the composite dynamic image so that the composite dynamic image is displayed in the predetermined screen, based on a generation result of the composite dynamic image generating device.

3. The server apparatus according to claim 2, wherein the terminal dynamic image and the target dynamic image are synthesized so that a display region for the terminal dynamic image is provided within a display region of the target dynamic image, and both of the terminal dynamic image and the target dynamic image are displayed in the display region for the target dynamic image.

4. The server apparatus according to claim 2, wherein the dynamic image acquiring device is configured to acquire a plurality of terminal dynamic images; and
the composite dynamic image generating device is configured to restrict based on a restrictive condition, use of at least a part of the plurality of terminal dynamic images, so that each terminal dynamic image satisfying the restrictive condition is not used for the composite dynamic image.

5. The server apparatus according to claim 4, wherein the dynamic image acquiring device is configured to restrict based on the restrictive condition, acquisition of at least a part of the plurality of terminal dynamic images, so that each terminal dynamic image satisfying the restrictive condition is not acquired.

6. The server apparatus according to claim 4, wherein the dynamic image acquiring device is configured to further acquire from the photography-use terminal, information indicating at least any one of photographing time and acquisition time of each terminal dynamic image,
the photographing time or the acquisition time is employed as a criterion for the restrictive condition; and
the restrictive condition is satisfied in a case that the photographing time or the acquisition time of each terminal dynamic image does not belong to a predetermined range.

7. The server apparatus according to claim 4, wherein the dynamic image acquiring device is configured to further acquire information of a photographing location of each terminal dynamic image from the photography-use terminal, and
the photographing location is employed as a criterion for the restrictive condition; and
the restrictive condition is satisfied in a case that the photographing location of each terminal dynamic image does not belong to a predetermined range of location.

8. The server apparatus according to claim 5, wherein the dynamic image acquiring device is configured to further acquire from the photography-use terminal, user identification information for identifying a user of each photography-use terminal in association with each terminal dynamic image,
the user identification information is employed as a criterion for the restrictive condition, and
the restrictive condition is satisfied in a case that the user identification information is not included or included in particular user data where the user identification information of each of a part of users is recorded.

9. The server apparatus according to claim 4, wherein the dynamic image providing device is configured to provide the plurality of terminal dynamic images and the target dynamic image so that the plurality of terminal dynamic images and the target dynamic image are displayed as the composite dynamic image.

10. The server apparatus according to claim 2, wherein each of the target dynamic image and the terminal dynamic image is divided into a plurality of frame dynamic images for each predetermined period in a time series, and
each of the plurality of frame dynamic images of the target dynamic image and each of the plurality of frame dynamic images of the terminal dynamic image are displayed in a synchronized manner as the composite dynamic image, so that passage of time with respect to the terminal dynamic image is synchronized with passage of time with respect to the target dynamic image.

11. The server apparatus according to claim 1, wherein the terminal dynamic image and the target dynamic image are synthesized so that a display region for the terminal dynamic image is provided within a display region of the target dynamic image, and both of the terminal dynamic image and the target dynamic image are displayed in the display region for the target dynamic image.

12. The server apparatus according to claim 1, being connected with the plurality of game machines installed to a plurality of facilities, wherein
facility location information indicating a location of each of the plurality of facilities where each game machine is installed is used as the dynamic image identification information,
information of a photographing location indicating a location where the terminal dynamic image has been photographed is used as the specific information, and
at least a part of the gaming dynamic images provided by the game machine of the facility corresponding to the photographing location is specified as the target dynamic image based on the facility location information and the information of the photographing location.

13. The server apparatus according to claim 1, wherein each game machine provides the dynamic image identification information, and
the dynamic image identification information provided by the game machine is used as the specific information.

14. The server apparatus according to claim 13, wherein each game machine, by displaying a code formed so that the dynamic image identification information is included, provides the dynamic image identification information to the photography-use terminal via the code.

15. The server apparatus according to claim 1, being connected with the plurality of game machines, and
chassis identification information for identifying each of the plurality of game machines from each other is used as the dynamic image identification information.

16. A control method for making a computer of a server apparatus, the server apparatus being connected with, via a network, at least one display-use terminal each being programmed to display a predetermined screen, at least one game machine each providing a plurality of game opportunities each being played through a game screen, and at least one photography-use terminal each being programmed to photograph a terminal dynamic image including a playing dynamic image where a user during game-play in each game opportunity has been photographed, and comprising a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images, the method for making the computer execute the following steps:

a dynamic image acquiring step of acquiring from the photography-use terminal, the terminal dynamic image, and specific information for specifying the dynamic image identification information which is associated with the terminal dynamic image;

a dynamic image determining step of determining a dynamic image corresponding to the dynamic image identification information specified by the specific information, as a target dynamic image within the plurality of dynamic images, based on an acquisition result of the dynamic image acquiring step;

a composite dynamic image generating step of generating a composite dynamic image where the terminal dynamic image and the target dynamic image are synthesized, based on a determination result of the dynamic image determining step; and a dynamic image providing step of providing the terminal dynamic image and the target dynamic image to the display-use terminal, based on a determination result of the dynamic image determining step, and providing the composite dynamic image so that the composite dynamic image is displayed in the predetermined screen, based on a generation result of the composite dynamic image generating step.

17. A non-transitory computer readable storage medium storing a computer program for a server apparatus, the server apparatus being connected with, via a network, at least one display-use terminal each being programmed to display a predetermined screen, at least one game machine each providing a plurality of game opportunities each being played through a game screen, and at least one photography-use terminal each being programmed to photograph a terminal dynamic image, and comprising a computer, and a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images, the computer program making the computer execute:

a dynamic image acquiring device which is configured to acquire from the photography-use terminal, the terminal dynamic image, and specific information for specifying the dynamic image identification information which is associated with the terminal dynamic image;

a dynamic image determining device which is configured to determine a dynamic image corresponding to the dynamic image identification information specified by the specific information, as a target dynamic image within the plurality of dynamic images, based on an acquisition result of the dynamic image acquiring device;

a dynamic image providing device which is configured to provide the terminal dynamic image and the target dynamic image to the display-use terminal, based on a generation result of the composite dynamic image generating device; and a composite dynamic image generating device which is configured to generate a composite dynamic image where the terminal dynamic image and the target dynamic image are synthesized, based on a determination result of the dynamic image determining device:

wherein the dynamic image providing device is configured to provide the composite dynamic image so that the composite dynamic image is displayed in the predetermined screen, based on a generation result of the composite dynamic image generating device.

18. A dynamic-image delivery system including at least one display-use terminal each being programmed to display a predetermined screen, at least one game machine each providing a plurality of game opportunities each being played through a game screen, at least one photography-use terminal each being programmed to photograph a terminal dynamic image, and a server apparatus, wherein the at least one display-use terminal, the at least one game machine, the at least one photography-use terminal, and the server apparatus are connected with each other via a network, the dynamic-image delivery system comprising:

a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images;

a dynamic image acquiring device programmed to acquire from the photography-use terminal, the terminal dynamic image, and specific information for specifying the dynamic image identification information which is associated with the terminal dynamic image;

a dynamic image determining device programmed to determine a dynamic image corresponding to the dynamic image identification information specified by the specific information, as a target dynamic image within the plurality of dynamic images, based on an acquisition result of the dynamic image acquiring device;

a dynamic image providing device programmed to provide the terminal dynamic image and the target dynamic image to the display-use terminal, based on a determination result of the dynamic image determining device; and a composite dynamic image generating device which is configured to generate a composite dynamic image where the terminal dynamic image and the target dynamic image are synthesized, based on a determination result of the dynamic image determining device;

wherein the dynamic image providing device is configured to provide the composite dynamic image so that the composite dynamic image is displayed in the predetermined screen, based on a generation result of the composite dynamic image generating device.

19. A dynamic-image delivery system in which at least one display-use terminal each being programmed to display a predetermined screen, at least one game machine each providing a plurality of game opportunities each being played through a game screen, at least one photography-use terminal each being programmed to photograph a terminal dynamic image, and a server apparatus are connected with each other via a network, the dynamic-image delivery system comprising:

a dynamic image storage device which stores a plurality of dynamic images different from each other in association with dynamic image identification information for identifying each of the plurality of the dynamic images, wherein a plurality of gaming dynamic images each showing change of the game screen which changes in time series with respect to each of the plurality of game opportunities are provided from the at least one game machine to the dynamic image storage device so that the plurality of gaming dynamic images are stored as the plurality of dynamic images;

a dynamic image acquiring device programmed to acquire from the photography-use terminal, the terminal dynamic image, and specific information for specifying the dynamic image identification information which is associated with the terminal dynamic image;

a dynamic image determining device programmed to determine a dynamic image corresponding to the dynamic image identification information specified by the specific information, as a target dynamic image within the plurality of dynamic images, based on an acquisition result of the dynamic image acquiring device;

a composite dynamic image generating device programmed to generate a composite dynamic image where the terminal dynamic image and the target dynamic image are synthesized, based on a determination result of the dynamic image determining device; and a dynamic image providing device programmed to:

provide the terminal dynamic image and the target dynamic image to the display-use terminal, based on a determination result of the dynamic image determining device; and provide the composite dynamic image so that the composite dynamic image is displayed in the predetermined screen, based on a generation result of the composite dynamic image generating device.

* * * * *